United States Patent
Riggs

(10) Patent No.: US 10,122,608 B1
(45) Date of Patent: *Nov. 6, 2018

(54) ROUTING MESSAGES TO USER DEVICES

(71) Applicant: Amazon Technologies, Inc., Seattle, WA (US)

(72) Inventor: Adam Schott Riggs, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 78 days.

This patent is subject to a terminal disclaimer.

(21) Appl. No.: 15/096,995

(22) Filed: Apr. 12, 2016

Related U.S. Application Data

(63) Continuation of application No. 14/469,118, filed on Aug. 26, 2014, now Pat. No. 9,319,856.

(51) Int. Cl.
| | |
|---|---|
| *H04L 12/26* | (2006.01) |
| *H04L 12/58* | (2006.01) |
| *H04W 4/12* | (2009.01) |

(52) U.S. Cl.
CPC ............ *H04L 43/106* (2013.01); *H04L 51/36* (2013.01); *H04L 51/38* (2013.01); *H04W 4/12* (2013.01)

(58) Field of Classification Search
CPC .................................................... H04L 43/106
USPC ....................................................... 455/466
See application file for complete search history.

(56) References Cited

U.S. PATENT DOCUMENTS

| | | | |
|---|---|---|---|
| 7,181,384 B1 * | 2/2007 | Riggs ................. | G06F 17/5022 703/14 |
| 7,194,252 B1 | 3/2007 | Jordan | |
| 8,090,241 B2 | 1/2012 | Rajakarunanayake | |
| 8,117,341 B2 * | 2/2012 | Matz ....................... | H04W 4/02 340/435 |
| 8,312,096 B2 | 11/2012 | Cohen | |
| 8,611,519 B2 | 12/2013 | Kamalkar et al. | |
| 8,634,848 B1 | 1/2014 | Bozarth et al. | |
| 8,769,682 B2 | 7/2014 | Choyi | |
| 8,823,507 B1 * | 9/2014 | Touloumtzis ........... | H04L 67/24 340/501 |
| 9,319,856 B1 * | 4/2016 | Riggs ...................... | H04W 4/12 |
| 2002/0177449 A1 * | 11/2002 | McDonnell ............. | H04L 41/00 455/456.1 |
| 2008/0132257 A1 * | 6/2008 | Fok .......................... | H04L 43/00 455/466 |
| 2009/0203390 A1 * | 8/2009 | Bradbury ............. | G06Q 10/107 455/466 |
| 2010/0042470 A1 | 2/2010 | Chang | |
| 2012/0280908 A1 | 11/2012 | Rhoads | |

* cited by examiner

Primary Examiner — Qutbuddin Ghulamali
(74) Attorney, Agent, or Firm — Eversheds Sutherland (US) LLP

(57) ABSTRACT

Systems and methods are disclosed for routing messages to one or more of a plurality of user devices associated with a particular user to whom a particular message is to be provided. The message destination user device(s) may be determined by evaluating the user interactions on each of the plurality of user device. The message destination user device(s) may be selected as the user device(s) that are predicted to have a relatively high level of interaction and/or activity with the user to whom the message is to be provided or is in relative proximity of the user to whom the message is to be provided. When the message destination user device(s) are determined, the message may be transmitted to that/those message destination user device(s) for rendering to the user to whom the message is to be provided.

20 Claims, 9 Drawing Sheets ized server(s) may be configured to transmit a message to

ROUTING MESSAGES TO USER DEVICES

CROSS-REFERENCE TO RELATED APPLICATION(S)

This patent application is a continuation of U.S. patent application Ser. No. 14/469,118, titled "Routing Messages to User Devices," filed Aug. 26, 2014, the entire disclosure of which is hereby incorporated by reference.

BACKGROUND

Often times, users may have multiple user devices, such as smartphones, tablet computing devices, smart TVs, or the like, where the user may be able to receive messages. If a particular message is sent to a particular one of the user's user devices that is not in the user's relative proximity, there may be a delay or inconvenience in the user seeing or otherwise having the message rendered.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures.

DETAILED DESCRIPTION

Overview

Figure 1:
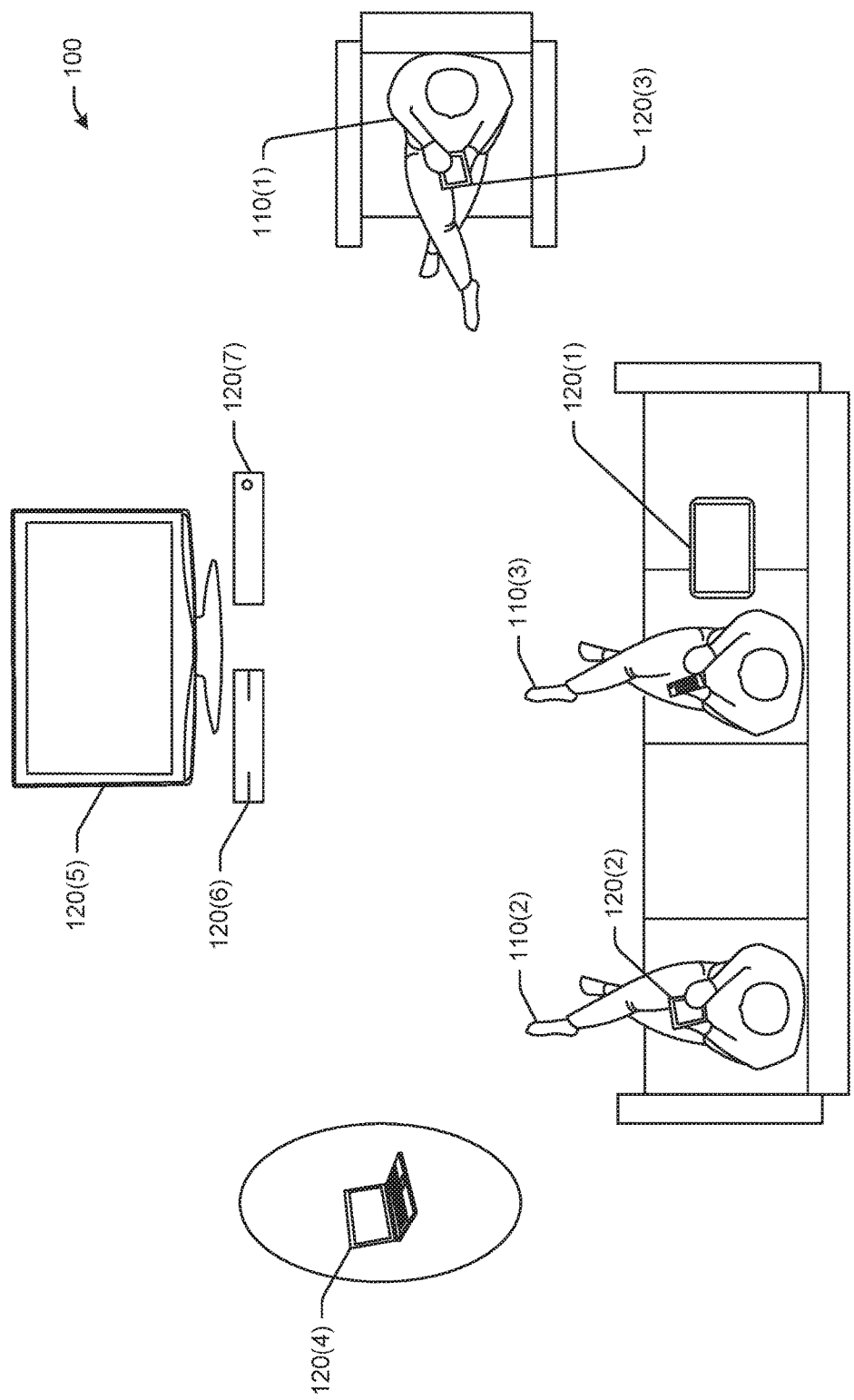
FIG. 1 is a schematic representation of an example environment including a plurality of user devices associated with one or more users, in accordance with example embodiments of the disclosure.

Example embodiments of the present disclosure are directed to, among other things, determining one or more target user device(s) associated with a particular user to which a message is to be delivered for rendering to the particular user. In example embodiments, the one or more target user device(s) may be a subset of user devices associated with the particular user to whom the message is to be delivered. The user devices associated with the user to whom the message is to be delivered may, in some cases, be associated with other users (e.g., shared user devices), such as users to whom the message is not to be delivered. The one or more target user device(s) to which the message is to be delivered may be selected from the user devices associated with the user to whom the message is to be delivered, in example embodiments, based at least in part on a prediction of which of the user device(s) are in proximity of the user and/or which of the user device(s) are being interacted with by the user to whom the message is to be delivered. In some example embodiments, the device(s) to which the message may be delivered may be selected further based at least in part on a prediction of whether the user in proximity of and/or interacting with the user devices is, indeed, the user to whom the message is to be delivered.

According to example embodiments, one or more messaging server(s) may be configured to transmit a message to a particular user via one or more of the user's user devices. In example embodiments, the message to be transmitted to a particular user may be addressed to an account associated with the user. This account may be an email address, a mobile phone number/text message number, a social media account, a short message handle, a Twitter® handle, instant message handle, combinations thereof, or the like. In these example embodiments, the messaging server(s) may be configured to determine the user to whom a message is to be transmitted based at least in part on an account to which the message is to be transmitted. In example embodiments, a particular user account may be associated with a single user. In other embodiments, a particular user account may be associated with more than one user (e.g., an email account that may be shared by a family of people). In this case, a variety of factors may be used to identify the user to whom the message is to be delivered from the user(s) associated with the user account. These factors may consider the user(s) demographical information, usage history, purchase history, current interaction, and/or logins on other user account(s).

In example embodiments, the messaging server(s) may be configured to determine a message destination user device associated with a user to whom a message is to be transmitted. The messaging server(s) may receive a message of any type, such as, for example, an instant message, a photo-message, a news item, a calendar reminder, a voicemail, an email, a broadcast update or warning, an internet web address, a one-on-one message from another user, combinations thereof, or the like. The message may be generated by the messaging server(s) or received from other entities via either direct communications link(s) or via network link(s), such as the Internet. The messaging server(s) may be configured to determine a user to whom the message is to be transmitted, such as based at least in part on the user account to which the message is to be transmitted. The user account, in example embodiments, may be identified form the received message, such as from header information and/or metadata of the message. Upon identifying the recipient user, according to example embodiments, the messaging server(s) may be configured to determine all or some of the user devices associated with the user to whom the message is to be delivered. This may be determined by accessing and/or maintaining a datastore of user related information, such as a listing of user device(s) associated with the user to whom the message is to be transmitted. The messaging server(s) may further identify if one or more of the user device(s) associated with the message receiving user are shared user devices. Some shared user device(s), in some cases, may be restricted from receiving certain messages. These restrictions may be configurable and may be specified in a user profile associated with the user to receive the message.

In addition to identifying user device(s) associated with a user to whom a message is to be transmitted (e.g., a user associated user account to which to send the message), the messaging server(s) may further be configured to transmit a polling request to each of the user devices associated with the user. The polling request may request information from one or more of the user devices, such as the last activities and/or user interaction(s) of the user devices, applications that are currently operating on the user devices, media content that may be playing on the user devices, the location (e.g., GPS coordinates, Wi-Fi Access Points, etc.) of the user devices, or the like. In some example embodiments, the messaging server(s) may be aware of which of the user devices associated with the user to whom the message is to be delivered are in a low-power, inactive, standby, sleep-mode, display-off mode, turned-off, airplane-mode, otherwise unable to communicate mode, and/or the like (hereinafter collectively referred to as inactive mode). In these cases, the messaging server(s) or another entity in communication with the messaging server(s) may receive a notification from a user device when the user device enters or exits an inactive mode for that user device. In these example embodiments, the messaging server(s) may only poll the user devices that are in an active mode and not in an inactive mode. In other words, the user device(s) 120 that are in inactive mode may be removed from a list of user devices that are to be polled by the messaging server(s). In this way, the messaging server(s) may already ascertain that there is a relatively low level of interaction by the user to whom the message is to be sent with the user devices that are in inactive mode. Additionally, by not polling the user devices in inactive mode, the messaging server does not risk waking-up those devices in inactive mode into an active mode, and thereby enhances user device battery life.

In example embodiments, responsive to the polling request, the messaging server(s) may receive responses from some or all of the user devices to which the polling request was sent by the messaging server(s). The polling response may provide one or more information that was requested by the messaging server(s). This information may include, for example, the last activities and/or user interaction(s) of the user devices, applications that are currently operating on the user devices, media content that may be playing on the user devices, the location (e.g., GPS coordinates, Wi-Fi Access Points, etc.) of the user devices, or the like. The messaging server(s) may have a time-out period within which it will collect responses from the various user devices. The polling responses, in example embodiments, may include an identifier of the polling request, user device, or user to whom the message is to be sent, to enable the messaging server(s) to associate the received polling responses to the particular message to be transmitted or the particular user to whom the message is to be transmitted. In some cases, a polling response may be received by the messaging server(s) from every user device to which a polling request was transmitted by the messaging server(s) associated with the message to be sent to the user. In other cases, a polling response may be received from fewer than all of the user devices to which a polling request was sent associated with the message to be sent to the user.

The messaging server(s), in example embodiments, may be configured to determine a message destination user device based at least in part on the received polling responses. The received poll responses and the information contained therein may be used, in example embodiments, by the messaging server(s) to ascertain a relative level of interactions and/or use of each of the user devices from which a polling response is received. The received poll responses and the information contained therein (e.g., user interactions, running applications, location, etc.) may further be used, in example embodiments, by the messaging server(s) to ascertain a relative level of identity confidence, or confidence that the user of a particular user device from which a polling response is received is indeed the user to whom the message is to be transmitted, for each of the user devices from which a polling response is received. In example embodiments, the relative level of interaction may be represented by an interaction score and the relative level of identity confidence may be represented by an identity confidence score. The determination of the message destination user device may be based at least in part on the interaction score and the identity confidence score, in example embodiments. In some example embodiments, the interaction score and/or identity confidence score may be determined by the messaging server(s) based at least in part on interaction information provided by the poll responding user devices and carried by the polling responses from these user devices. In other example embodiments, the user devices may provide an interaction score and/or an identity confidence score. The interaction scores and/or the identity confidence scores, in example embodiments, may be representative of the nearest user device 120 to the user to whose user account the message is to be delivered.

The concepts as discussed above may be better understood with reference to FIG. 1. FIG. 1 is a schematic representation of an example environment 100 including a plurality of user devices 120(1), 120(2), 120(3), 120(4), 120(5), 120(6), 120(7) (referred to individually or collectively as user device(s) 120) associated with one or more users 110(1), 110(2), 110(3) (referred to individually or collectively as user(s) 110), in accordance with example embodiments of the disclosure. The environment 100, while depicted as a family's living room setting, may be any suitable setting where there may be one or more user(s) 110 and user device(s) 120, such as a work setting, a home setting, a restaurant setting, a store setting, a public setting, a private setting, or the like. As depicted, there may be any variety of user devices 120 in environment 100, such as a tablet computing device 120(1), a smartphone 120(2), another smartphone 120(3), a laptop computer 120(4), a smart television 120(5), a game console 120(6), and a set-top box (STB) 120(7). Additional types of user devices 120 may include wearable devices (e.g., smart glasses, wrist/arm bands (e.g., watches, biometric sensors, etc.)), automobiles (e.g., car stereos, in-vehicle infotainment systems, etc.), wireless speakers, home security/monitoring equipment, microphone systems, networking equipment (WiFi router), retail/commercial equipment (e.g., smart billboards, iBeacons), or the like.

Some of the user devices 120 may be shared devices. For example, the smart television 120(5), the game console 120(6), the STB 120(7), and the tablet computing device 120(1) may be shared among the three users 110(1), 110(2), 110(3) in environment 100. Additionally, some other user devices 120 may not be shared. For example, the smart phone 120(2) may only be used by the user 110(2) and the smartphone 120(3) may only be used by the user 110(1). Some types of user devices, such as wearable devices, may be in relatively closer proximity to the user than other types of user devices, such as the smart television 120(5). In some example embodiments, smart phone 120(2) may be considered for transmission of the message if connected to wearable device on the user 110, sometimes even if that smart phone 120(2) is in an inactive mode. It will be appreciated that while not all environments and/or settings may have the same user devices 120 as depicted here for environment 100, a variety of environments may have a plurality of user devices 120. Furthermore, some, all, or none of the user devices 120 may be shared by more than one user 110.

In this environment 110, when a message is to be sent to a user account, the user 110 associated with that user account may be ascertained. In some cases, the user account may be associated with only single user and/or user profile. An example of this may be a user's personal email address. In other cases, there may be multiple users and/or user profiles associated with one account (e.g., mom account for user device 120, dad account for the user device 120, and child account for same user device 120 which has parental control restrictions). There may also multiple services for each account/profile (e.g., email service, social media service, streaming movie service, music service, physical product service, cloud storage service, etc.). All of these services may have associated messages (e.g., notification your package is delivered, new email in your inbox, file has been shared with your cloud storage box, etc.). As such, it will be appreciated that a message may be identified to be transmitted to a particular user account and that particular user account identification may be used to identify the user(s) associated with the message. In some cases, identifying a user 110 to whom the message is to be transmitted may be based at least in part on the email address, mobile phone number, or other address information to which the message is to be sent. In other cases, such as when multiple profiles are associated with same account/email address/device additional elements may be considered in identifying the user 110 that is to receive the message. This analysis may consider elements such as content type of the message (e.g., children's content v. adult content), past usage history, preferences associated with a user 110, purchase history of the user 110, demographical data associated with the user 110, etc.

In example embodiments, when it is identified that a message is to be sent to one of the users 110 (e.g., the user's user account), it may be determined which user devices 120 are associated with that user 110. After identifying the user devices 120 associated with the particular user 110 and his/her user account, some or all of the user devices 120 associated with that user 110 may be polled for a variety of information, such as the time of the last interaction, the type of the last interaction, applications running thereon, location information, recorded sound clips, recorded video clips, sensor information, accelerometer information, combinations thereof, or the like. Some or all of the user devices 120 that have been polled may respond to the poll by providing some or all of the information requested from the user device in the poll received by the user devices 120. Therefore, each of the user devices that respond to the poll may provide information, such as the time of the last interaction, the type of the last interaction, applications running thereon, location information, recorded sound clips, recorded video clips, sensor information, accelerometer information, combinations thereof, or the like. This information may be used to determine a message destination user device from among the user devices associated with the user to whom the message is to be transmitted that have responded to the poll within a predetermined period of time. In other example embodiments, the user devices 120 may determine an interaction score and/or identity confidence, based at least in part on user interactions of the user device 120, and provide the interaction score and/or the identity confidence score as a response to the polling request, in the form of a polling response.

In example embodiments, the message destination user device may be determined based at least in part on an interaction score associated with each of the responding user devices 120 and an identity confidence score associated with each of the responding user devices 120. In these example embodiments, the user interaction score and the identity confidence score may be determined based at least in part on the polling response information provided by responding user devices 120. Once the message destination user device is determined the message may be transmitted to that user device 120 for rendering to the user 110 to whom the message is to be delivered.

It will be appreciated that in some cases, when multiple users 110 and/or profiles are associated with same account, email address, and/or user device 120, additional elements may be considered in identifying the user 110 that is to receive the message. This analysis may consider elements such as content type of the message (e.g., children's content v. adult content, past usage history, preferences associated with a user 110, purchase history of the user 110, demographical data associated with the user 110, etc.).

It will be appreciated that in the environment 100 with multiple user devices 120 associated with a particular user 110, delivering a particular message to the user 110 on one of his/her user devices 120 with which the user 110 is interacting and/or is in relative proximity and/or is nearest may increase the likelihood that the message may be viewed relatively quickly and conveniently by the user 110 to whom the message was directed.

This brief introduction, including section titles and corresponding summaries, is provided for the reader's convenience and is not intended to limit the scope of the claims nor the preceding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architecture

Figure 2:
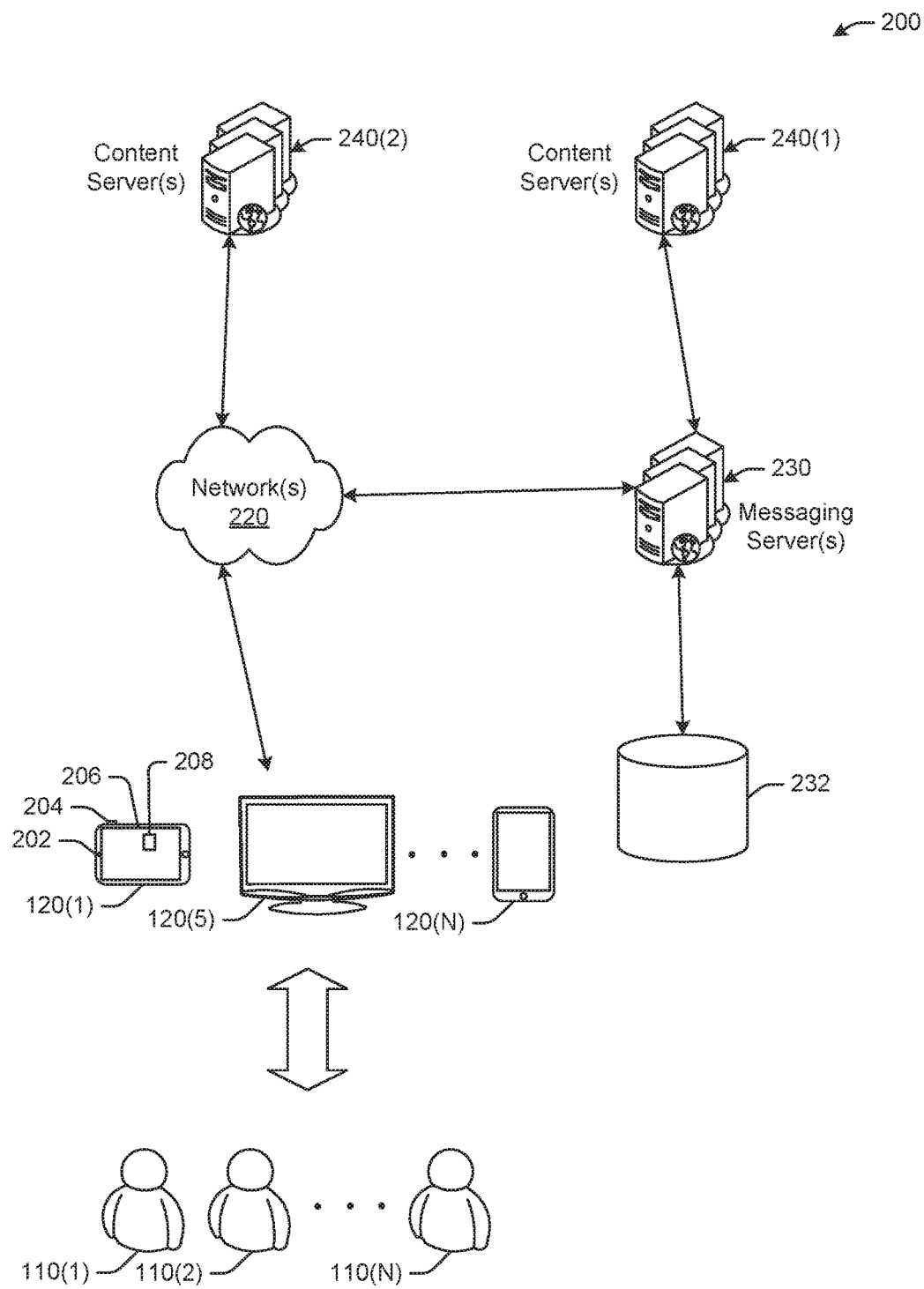
FIG. 2 is a schematic representation of an example environment including messaging server(s) for directing messages to one or more user devices associated with a user, in accordance with example embodiments of the disclosure.

FIG. 2 is a schematic representation of an example environment including one or more messaging server(s) 230 for directing messages to one or more user devices 120 associated with the user(s) 110, in accordance with example embodiments of the disclosure. The environment 200 may further include one or more content server(s) 240(1), 240(2) (referred to individually or collectively as content server(s) 240) that may interact with the messaging server(s) 230 to provide one or more content to the messaging server(s) 230 that that may be directed to one of the users 110 and may be transmitted one of the user's user devices 120 as a message to the user 110.

The content server(s) 240 may be associated with individuals or other entities, such as corporations, non-profit organizations, for-profit organizations, government organizations, public sector organizations, or any of the aforementioned entities located in this country or foreign countries that may be able to provide and/or route a message or content that is to be delivered as a message to one or more users 110. The message(s) provided by the content server(s) 240 may include any suitable type, including, for example, an instant message, a photo-message, a news item, a calendar reminder, a voicemail, an email, a broadcast update or warning, an internet web address, a one-on-one message from another user, combinations thereof, or the like. The content server(s) may be configured to provide message(s) with any suitable type of content, such as text, images, video, audio, haptics, combinations thereof, or the like. The content server(s) 240 may be configured to provide message(s), or the content associated therewith, to the messaging server(s) 230 via a direct communicative connection with the messaging server(s) 230, such as in the case of content server(s) 240(1) or via one or more networks 220, such as in the case of content server(s) 240(2).

The one or more network(s) 220 may include any one or a combination of different types of suitable communications networks, such as cable networks, the Internet, wireless networks, cellular networks, and other private and/or public networks. Furthermore, the networks 270 may include any variety of medium over which network traffic is carried including, but not limited to, coaxial cable, twisted wire pair, optical fiber, hybrid fiber coaxial (HFC), microwave terrestrial transceivers, radio frequency communications, satellite communications, or combinations thereof. The network(s) 220 may provide communications connectivity between the content server(s) 240 and the messaging server(s) 230, in some cases. Furthermore, the network(s) 220 may provide communications connectivity between the messaging server(s) 230 and the user devices 120 associated with one or more users 110. Indeed, in example embodiments, the network(s) 220 may be the conduit via which messages are delivered from the messaging server(s) 230 to the user devices 120.

As discussed above, the user devices 120 may be any one of suitable devices that may be configured to execute applications, provide services to the users 110, and/or connect, continuously or intermittently, to the one or more network(s) 220. The user device 120 may include, but is not limited to, a personal computer, a desktop computer, a notebook computer, a laptop computer, a personal digital assistant, an electronic book (ebook) reader, a tablet computing device, a pad computing device, a smartphone, a web-enabled television, a game console, a set-top box (STB), combinations thereof, or the like. The user device 120 may be configured to receive a message from the messaging server(s) 230 or other entities, such as via the network(s) 220, and render the message to one or more users 110.

The user devices 120 may further include one or more user interfaces, such as touch sensitive screen 206, to accept user input, provide output to the user 110, and/or otherwise provide a mechanism for the user 110 to interact with the user device 120. The user interfaces of the user device 120 may include, but are not limited to, one or more user input/output interfaces, such as a display, a touch sensitive display 206, a speaker, a haptic output, or the like. The user device may further include one or more sensors, such as a camera/image sensor 202 for capturing images and/or video, a microphone 204 for capturing and/or recording sounds, and/or motion sensors 208 (e.g. micro-electromechanical system (MEMS) accelerometers, gyroscopes, etc.), or global navigation satellite system (GNSS) apparatus for receiving GNSS signals and determining location information therefrom.

The user device 120 may be configured, in example embodiments, to provide output to the user 110, such as render a received message, using one or more of the user interfaces, such as the touch sensitive display 206. The user device 120 may further be configured to receive user input from one or more users 110 via the one or more user interfaces, such as the touch sensitive display 206 to execute applications and/or software to participate in enabling determining and/or routing of messages to a message destination user device associated with a particular user 110 to whom a message is to be provided, such as by the messaging server(s) 230. It will be appreciated that not all types of user devices will have the same kinds or the same number of user interfaces. For example a desktop computer 120 may have a mouse, keyboard, speakers, microphones, and display monitor(s), while a tablet computing device 120 may have a touch sensitive screen, motion sensor-based input, one or more buttons/switches, microphones, an image sensor, and/or haptic output systems. It will also be appreciated that some of the user interfaces, in example embodiments, may also be one or more sensors 202, 204, 208, and vice-versa.

In example embodiments, the user device 120 may further be configured to log interactions with a user 110, or otherwise cache an indication of interactions with the user 110. These interactions may include any variety of suitable information that may indicate a user's interactions, activity, and/or proximity to the user device 110. The interactions may include, motion information (e.g. sensed vibrations via a MEMS accelerometer), sounds (e.g. a user's voice recognized by the user device 110), images (e.g. a user's facial recognition), location information (e.g. GNSS coordinates), direct user input (e.g., a user gesture performed on a touch sensitive screen of the user device 110 or keystrokes on a keyboard) and/or output (e.g., a media content being rendered by the user device 110 or an application being executed by the user device 110). The user device 120 may log the interactions in a memory of the user device 120.

The user device 120, in example embodiments, may further be configured to receive a polling request, such as from the messaging server(s) 230 via the network(s) 220. The user devices 120 may further be configured to access the log of user interactions associated with the user device 120 and select one or more of the user interactions. The selected user interactions may be those user interactions that may be deemed the most relevant by the messaging server(s) 230 in assessing the relative level of interaction, activity, and/or proximity of the user 110 to whom the message is to be sent to the user device 120. For example, a relatively recent and direct user input to the user device 120 may be more relevant to deeming that user device the message destination user device than, for example, an audio based detection of the user's voice at a relatively longer time period from the present. In this case example, the user device may be configured to select the direct user input over other user interactions that may have been logged. The user device 120 may be configured to select from the log of user interactions based at least in part on a weighting associated with each type of user interactions and/or based at least in part on a corresponding time associated with a logged user interaction. The user interactions may include, but are not limited to, motion information (e.g. sensed vibrations via a MEMS accelerometer), sounds (e.g. a user's voice recognized by the user device 110), images (e.g. a user's facial recognition), direct user input (e.g., a user gesture performed on a touch sensitive screen of the user device 110 or keystrokes on a keyboard) and/or output (e.g., a media content being rendered by the user device 110 or an application being executed by the user device 110). The user interactions may further include biometric measurements (e.g., detecting a heartbeat, pulse, breathing, iris, fingerprint, etc.). In example embodiments, the user device 120 may weigh relatively more active and direct user interactions with a greater weight (e.g., more indicative of greater user 110 interaction, activity, and/or more relative user 110 proximity) than relatively more passive and or indirect interactions. In the same or other embodiments, the user device 120 may weigh relatively more recent user interactions with a greater weight (e.g., more indicative of greater user 110 interactions, activity, and/or more relative user 110 proximity) than relatively less recent user interactions.

Upon selecting one or more user interactions, the user device 120 may be configured to generate a polling response message including an indication of the selected user interaction(s) and their corresponding times. The user device 120, in example embodiments, may be configured to transmit this polling response to the messaging server(s) 230, where the polling response may be used to select a message destination user device from among the user devices 120 associate with the user 110 to whom the message is to be delivered. The user device 120 may be configured to transmit the polling response via the network(s) 220 to the messaging server(s) 230.

In some example embodiments, the user device 120 may generate a user interaction score and an identity confidence score, based at least in part on the user interactions deemed to be most relevant from the log of user interactions. The most relevant user interactions, as recorded in the log of user interactions, may be ascertained based at least in part on a timestamp of the user interactions recorded in the log, and/or may be based at least in part on a ranking of various types of interactions, where active user interactions may be weighted more heavily than passive user interactions. For example, a relatively recent and direct user input to the user device 120 may be deemed more relevant to determining the user interaction score and/or the identity confidence score than, for example, an audio based detection of the user's voice at a relatively longer time period from the present. In this case example, the user device may be configured to select the direct user input over other user interactions that may have been logged for the purposes of determining the user interaction score and/or the identity confidence score. Therefore, user device 120 may be configured to select from the log of user interactions based at least in part on a weighting associated with each type of user interactions and/or based at least in part on a corresponding time associated with a logged user interaction.

In example embodiments, the user interaction score may be based on a variety of factors, such as the type of interaction with the user device and how recent the interaction was on the user device. For example, a relatively fresh user interaction on the tablet computing device 120(1) may indicate a relatively greater probability of user interaction than requesting media content on the smart television 120 (5). For example, a relatively fresh user interaction may be on the order of about 1 minute or less prior to the current time, while an interaction that may have transpired more than 5 minutes ago may be relatively stale. In this case, the tablet computing device 120(1) may provide a polling response with a greater user interaction score than the smart television 120(5). The user device 120 may consider a variety of user interactions in determining the user interaction score. These user interactions may include direct interaction, such as touching a touch sensitive display 206 or other user interfaces, remote user device access, or the like. Other user interactions may be relatively less direct, including detected physical movement, such as detecting the device is in motion via an accelerometer or gyro sensor. This type of physical movement without direct user interaction may indicate that the user device 110 may be in relative proximity of the user 110 (e.g., on his/her person), without being actively used. Still further user interactions may include network movement, such as determining the user device is in motion via cell or WiFi network proximity. Again, this might indicate the relative proximity of the user 110 to the user device 120 without, necessarily any direct user interaction such as user input to the user device 120. Proximity of a user 110 may further be determined from ambient audio (e.g. speaking in room), with or without voice recognition of the user 110, or direct audio (e.g. speaking during a phone call), and/or detection of nearby motion. The user devices 120, in example embodiments, may also provide an estimate of identity confidence that the activity in question represents the specific user who is the message recipient. The identity confidence may be determined using a variety of factors including the user device type. For example, a television is relatively more likely to be shared, a tablet is somewhat likely to be shared, a phone or wearable devices are less likely to be shared. Another factor may include identification of logged in sessions, for user devices 120 that support user profiles and/or accounts (e.g., logging into a computer or user account. Yet another factor may include voiceprint matching (e.g., user's voice detection). Still another factor may include media content being rendered on user device 120 or applications being executed on user device 120 (e.g., media content and/or application preferences of shared users 110 may be known and stored as user profiles of shared users 110).

The user device 120 may further be configured to providing an indication of when it is entering an inactive mode and/or exiting an inactive mode, in example embodiments. This indication may be provided as a message transmitted by the user device 120 to the messaging server(s) and/or other entities of the environment 200 just prior to the user device 120 entering the inactive mode and indicating the same and/or just after the user device 120 wakes-up from inactive mode and again, indicating the same. By providing information regarding when the user device enters and/or exits a sleep, low-power mode, or inactive mode, the messaging server(s) 230 have information that enables the messaging server(s) 230 to avoid polling those user devices 120 associated with the particular user 110 to whose user account the message is to be delivered that are in an inactive mode. In other example embodiments, the messaging server(s) 230 may be configured to identify a user device 120 in inactive mode when the user device indicates time range that WiFi is deactivated, the user device 120 indicates that it is in do not disturb mode, and/or the user device 120 is determined to be in a car moving vehicle.

The messaging server(s) 230 may be configured to generate and/or receive, such as from the content server(s) 240, a message to be provided to a particular user account associated with a particular user 110 or user(s) 110. The messaging server(s) 230 may further be configured to access a datastore, such as a user profile datastore 232, to determine if a relatively fresh assessment of a message destination user device is available for the user 110 that is to be the recipient of the message. In some example embodiments, the datastore 232 may be in the cloud and may be accessed via one or more storage server(s). This assessment may be determined, based at least in part, on comparing a timestamp associated with the available message destination user device to a predetermined time window. If the message destination user device assessment had been performed within the predetermined time window (e.g., the message destination user device assessment has not gone stale), then the message may be transmitted, by the messaging server(s) 230 to the determined message destination user device.

However, if the message destination user device assessment is found to be stale (e.g., the most current assessment of the message destination user device is older than the predetermined time window form the present time), then the messaging server(s) 230 may be configured to make another assessment of the message destination user device for the user 110 to whom the message is to be provided. In this case, the messaging server(s) 230 may identify the user devices 120 that are associated with a user 110. These may be the option of user devices 120 where the message may be transmitted for the recipient user device 120 to render the message to the target user 110. The user devices 120 associated with the user 110 may be determined by accessing a datastore, such as the user profile datastore 232, where a mapping of user devices 120 to users 110 may be maintained, such as by the messaging server(s) 230.

Upon identifying the user devices 120 associated with a user 110 to whom the message is to be sent, the messaging server(s) 230 may be configured to generate a polling request and send the polling request, such as via the network(s) 220, to each of the user device(s) 120 associated with the user 110. It will be appreciated that some of the user devices 120 may be shared user devices 120 (e.g., user devices 120 that can be accessed and/or used by users 110 other than the user to whom the message is to be sent), while other user devices 120 may not be shared user devices 120. The polling request may, in example embodiments, carry a request for a response from the user device 120 to which the polling request is sent to provide information that may be used for evaluating the user device 120 as the message destination user device, or otherwise the user device 120 to which the message to the user 110 is to be routed.

In some example embodiments, the expected polling response from the user device, responsive to the polling request, may include an indication and/or identification of one or more user interactions with the user device. The indication of the one or more user interactions may further include a timestamp associated with each of the one or more user interactions reported by the polled user device(s) 120. The timestamp may indicate the start time, end time, and/or range of times associated with a particular user interaction. These user interactions may include, for example, audio clips, or indications thereof, voice recognition identification, location/coordinates of the user device 120, video/images, or indications thereof, facial recognition information, user input to the user device 120, user output from the user device 120, motion of the user device 120, session logins on the user device 120, media content being rendered on the user device 120, applications being run on the user device 120, combinations thereof, or the like. In other example embodiments, the user device, in its polling response, may provide an interaction score and/or an identity confidence score. The interaction score and the identity confidence score may be determined by the user device based upon one or more user interactions logged by the user device 120 and one or more algorithms, weights, and/or rules for determining the interaction score and the identity confidence score.

The messaging server(s) 230 may be configured, in some embodiments, to not send a polling request to user devices 120 that may be in a inactive mode. In these example embodiments, the messaging server(s) 230 may be configured to track when a user device 120 enters or exits an inactive mode or access another system that can provide such information. By not polling a user device 120 in inactive mode that is associated with the user 110 to whom the message is to be provided, the messaging server(s) 230 may avoid unnecessarily waking-up a user device 120 that is relatively unlikely to either respond with relevant polling response for determining it to be the message destination user device or is unlikely to be determined as the message destination user device.

The messaging server(s) 230 may be configured to receive a polling response from one or more of the user devices 120 to which a polling request was sent. In example embodiments, the polling response(s) may be received, by the messaging server(s) 230, for a predetermined time window after the polling request was transmitted. In this way, there may not be an indefinite time for the user device(s) 120 to respond to the polling request transmitted by the messaging server(s) 230. In some cases, user device(s) 120 may not be able to respond to the messaging server(s) 230 within the predetermined time window, such as due to poor network connectivity or other reasons.

In example embodiments, after the messaging server(s) 230 receive the polling response, the messaging server(s) 230 may be configured to ascertain a message destination user device 120 the user device(s) 120 that responded with a polling response. In some example embodiments, the messaging server(s) 230 may be configured to determine the message destination user device based at least in part on an interaction score and/or an identity confidence score for each of the user devices 120 that responded with a polling response. In some example embodiments, the user devices 120 themselves, may, in their respective polling responses, provide an interaction score and/or an identity confidence score for that responding user device 120. In this case, the messaging server(s) 230 may be configured to utilize these raw score(s) received from the user device(s) 120, as carried by the polling response, in determining the message destination user device. In some other of these case, the messaging server(s) 230 may utilize the received raw score(s) from the responding user device(s) 120 and perform some post-processing, such as normalizing across and/or adjusting based on all the score(s) received, to generate an interaction score and/or identity confidence score that may be utilized to determine a message destination user device. Once a message destination user device is determined, the messaging server(s) 230 may be configured to transmit the message to the user device 120 deemed the message destination user device.

Figure 3:
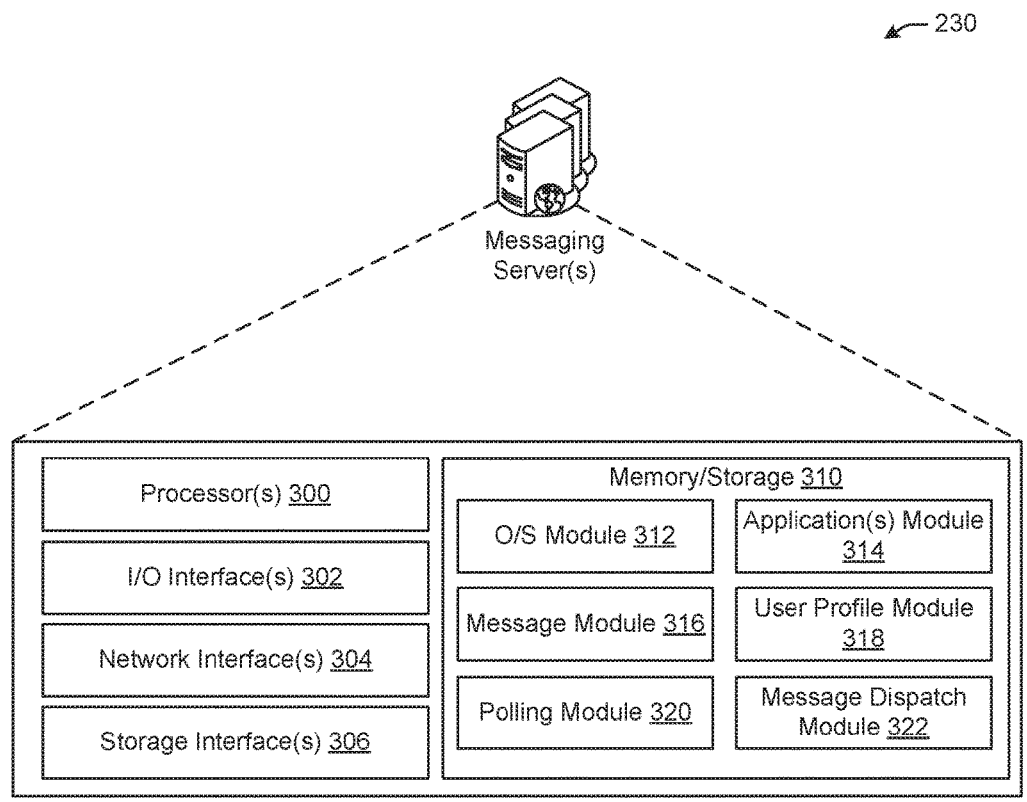
FIG. 3 is a block diagram of an example messaging server(s) for directing messages to the one or more user devices, in accordance with example embodiments of the disclosure.

FIG. 3 is a block diagram of the messaging server(s) 230 for directing messages to the one or more user devices, in accordance with example embodiments of the disclosure. The messaging server(s) 230 may include one or more processors 300, one or more I/O device interfaces 302, one or more network interface(s) 304, one or more storage interface(s) 306, and one or more memories/storage 310.

In some example embodiments, the processors 300 of the messaging server(s) 230 may be implemented as appropriate in hardware, software, firmware, or combinations thereof. Software or firmware implementations of the processors 300 may include computer-executable or machine-executable instructions written in any suitable programming language to perform the various functions described. Hardware implementations of the processors 300 may be configured to execute computer-executable or machine-executable instructions to perform the various functions described. The one or more processors 300 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The messaging server(s) 230 may also include a chipset (not shown) for controlling communication between the one or more processors 300 and one or more of the other components of the messaging server(s) 230. The one or more processors 300 may also include one or more application specific integrated circuits (ASICs) or application specific standard products (ASSPs) for handling specific data processing functions or tasks.

The input/output (I/O) device(s) such as the touch sensitive display screen(s), speaker(s), haptic device(s), or the like, may be controlled via the one or more I/O device interfaces 302. The network interfaces(s) 304 may allow the messaging server(s) 230 to communicate via the networks 220 and/or via other communicative channels. The messaging server(s) 230 may, therefore, be configured to access one or more remote servers, cloud servers, and/or cloud storage resources. The storage interface(s) 306 may enable the messaging server(s) 230 to read and/or write to any variety of datastores, including, for example, the profile datastore 232.

The memory/storage 310 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

The memory/storage 310 may store program instructions that are loadable and executable on the processor(s) 300, as well as data generated or received during the execution of these programs. Turning to the contents of the memory/storage 310 in more detail, the memory/storage 310 may include one or more operating systems (O/S) 312, an applications module 314, a message module 316, a user profile module 318, a polling module 320, and a message dispatch module 322. Each of the modules and/or software may provide functionality for the messaging server(s) 230, when executed by the processors 300. The modules and/or the software may or may not correspond to physical locations and/or addresses in memory/storage 310. In other words, the contents of each of the modules 312, 314, 316, 318, 320, 322 may not be segregated from each other and may, in fact be stored in at least partially interleaved positions on the memory/storage 310.

The O/S module 312 may have one or more operating systems stored thereon. The processors 300 may be configured to access and execute one or more operating systems stored in the (O/S) module 312 to operate the system functions of the messaging server(s) 230. System functions, as managed by the operating system may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like.

The application(s) module 314 may contain instructions and/or applications thereon that may be executed by the processors 300 to provide one or more services. These instructions and/or applications may, in certain aspects, interact with the (O/S) module 312 and/or other modules of the messaging server(s) 230. The applications module 314 may have instructions, software, and/or code stored thereon that may be launched and/or executed by the processors 300 to execute one or more applications and functionality associated therewith. These applications may include, but are not limited to, functionality such as web browsing, business, communication, graphics, word processing, publishing, spreadsheets, databases, gaming, education, entertainment, media, project planning, engineering, drawing, or combinations thereof. In certain embodiments, the applications that are stored in the applications module 314 and executable by the processors 300 may provide functionality associated with polling user devices 120 and directing messages associated with a particular user.

The message module 316 may have instructions stored thereon that when executed by the processors 300, configure the messaging server(s) 230 to perform a variety of functions associated with receiving and/or generating messages to be transmitted to one or more user devices 120 associated with a particular user 110 (e.g., a user account associated with the particular user 110). The processor(s) 300 may be configured to generate and/or receive, such as from the content server(s) 240, a message to be provided to a particular user 110. In some cases, content, such as a news item, media content, or calendar item, may be received from content server(s) 240 or other entities and the processor(s) 300 may be configured to generate a message incorporating the content received. In example embodiments, the processor(s) may be configured to ascertain an identity of an intended recipient user 110 for messages or content received from the content server(s) 240 or other sources of messages and/or content. In some cases, identifying a user 110 to whom the message is to be transmitted may be based at least in part on the email address, mobile phone number, or other address information to which the message is to be sent. In other cases, such as when multiple users 110 and/or profiles are associated with same account, email address, user device 120 additional elements may be considered in identifying the user 110 that is to receive the message. This analysis may consider elements such as content type of the message (e.g., children's content v. adult content, past usage history, preferences associated with a user 110, purchase history of the user 110, demographical data associated with the user 110, etc.).

The user profile module 318 may have instructions stored thereon that when executed by the processors 300 may enable the messaging server(s) 230 to provide various functionality associated with determining if a fresh message destination user device is associated with a particular user 110 and determining a variety of user devices 120 associated with the particular user 110 to whom a message is to be provided. The processor(s) 300 may be configured to access a datastore, such as the user profile datastore 232, to determine if a relatively fresh assessment of a message destination user device is available for the user 110 that is to be the recipient of the message. This assessment may be determined, based at least in part, on comparing a timestamp associated with the available message destination user device to a predetermined time window. If the message destination user device assessment had been performed within the predetermined time window (e.g., the message destination user device assessment has not gone stale), then the message may be transmitted, by the processor(s) 300 to the determined message destination user device.

If, however, the message destination user device assessment is found to be stale (e.g., the most current assessment of the message destination user device is older than the predetermined time window form the present time), then the processor(s) 300 may be configured to make another assessment of the message destination user device for the user 110 to whom the message is to be provided. In this case, the processor(s) 300 may be configured to identify the user devices 120 that are associated with a user 110. These may be the user devices 120 from which the message destination user device is to be selected by the processor(s) 300 in cooperation with processes enabled by the instructions stored in the polling module 320. The user devices 120 associated with the user 110 may be determined by accessing a datastore, such as the user profile datastore 232, where a mapping of user devices 120 to users 110 may be maintained, such as by the processor(s) 300.

The polling module 320 may have instructions stored thereon that when executed by the processors 300 may enable the messaging server(s) 230 to poll one or more user device(s) 120, such as user devices that may be configured to render a message to a particular user to whom a message is to be delivered by the messaging server(s) 230. The processors 300 may be configured to generate a polling request and send the polling request, such as via the network(s) 220, to each of the user devices 120 associated with the user 110 that is to receive the message. It will be appreciated that some of the user devices 120 may be shared user devices 120 (e.g., user devices 120 that can be accessed and/or used by users 110 other than the user 110 to whom the message is to be sent), while other user devices 120 may not be shared user devices 120. The polling request may, in example embodiments, carry a request for a response from the user device 120 to which the polling request is sent to provide information that may be used for evaluating the user device 120 as the message destination user device, or otherwise the user device 120 to which the message to the user 110 is to be routed.

By further executing the instructions stored in the polling module 320, the processor(s) 300 may be configured, in some embodiments, to not send a polling request to user devices 120 that may be in an inactive mode. In these example embodiments, the processor(s) 300 may be configured to track when a user device 120 enters or exits an inactive mode or access another system that can provide such information.

The processors(s) 300, by further executing instructions stored in the polling module 320, may be configured to receive a polling response from one or more of the user devices 120 to which a polling request was sent. In example embodiments, the polling response(s) may be received, by the processor(s) 300, for a predetermined time window after the polling request was transmitted. In some cases, user device(s) 120 may not be able to respond to the messaging server(s) 230 within the predetermined time window, such as due to poor network connectivity or other reasons.

The message dispatch module 322 may have instructions stored thereon that when executed by the processors 300 may enable the messaging server(s) 230 to determine a message destination user device and transmit a message to the determined message destination user device. In example embodiments, after the processor(s) 300 receive the polling response, the processor(s) 300 may be configured to ascertain a message destination user device 120 from among the user device(s) 120 that responded with a polling response. In some example embodiments, the processor(s) 300 may be configured to determine the message destination user device based at least in part on an interaction score and/or an identity confidence score for each of the user devices 120 that responded with a polling response. In some example embodiments, the user devices 120 themselves may, in their respective polling responses, provide an interaction score and/or an identity confidence score for that responding user device 120. In this case, the messaging server(s) 230 may be configured to utilize these raw score(s) received from the user device(s) 120, as carried by the polling response, in determining the message destination user device. In some other of these cases, the processor(s) 300 may utilize the received raw score(s) from the responding user device(s) 120 and perform some post-processing, such as normalizing across and/or adjusting based on all the score(s) received, to generate an interaction score and/or identity confidence score that may be utilized to determine the message destination user device. Once a message destination user device is determined, the messaging server(s) 230 may be configured to transmit the message to the user device 120 deemed the message destination user device.

It will be appreciated that there may be overlap in the functionality of the instructions stored in the operating systems (O/S) module 312, the applications module 314, the message module 316, the user profile module 318, the polling module 320, and the message dispatch module 322. In fact, the functions of the aforementioned modules 312, 314, 316, 318, 320, 322 may interact and cooperate seamlessly under the framework of the messaging server(s) 230. Indeed, each of the functions described for any of the modules 312, 314, 316, 318, 320, 322 may be stored in any module 312, 314, 316, 318, 320, 322 in accordance with certain example embodiments of the disclosure. Further, in certain example embodiments, there may be one single module that includes the instructions, programs, and/or applications described within the operating systems (O/S) module 312, the applications module 314, the message module 316, the user profile module 318, the polling module 320, and the message dispatch module 322.

Figure 4:
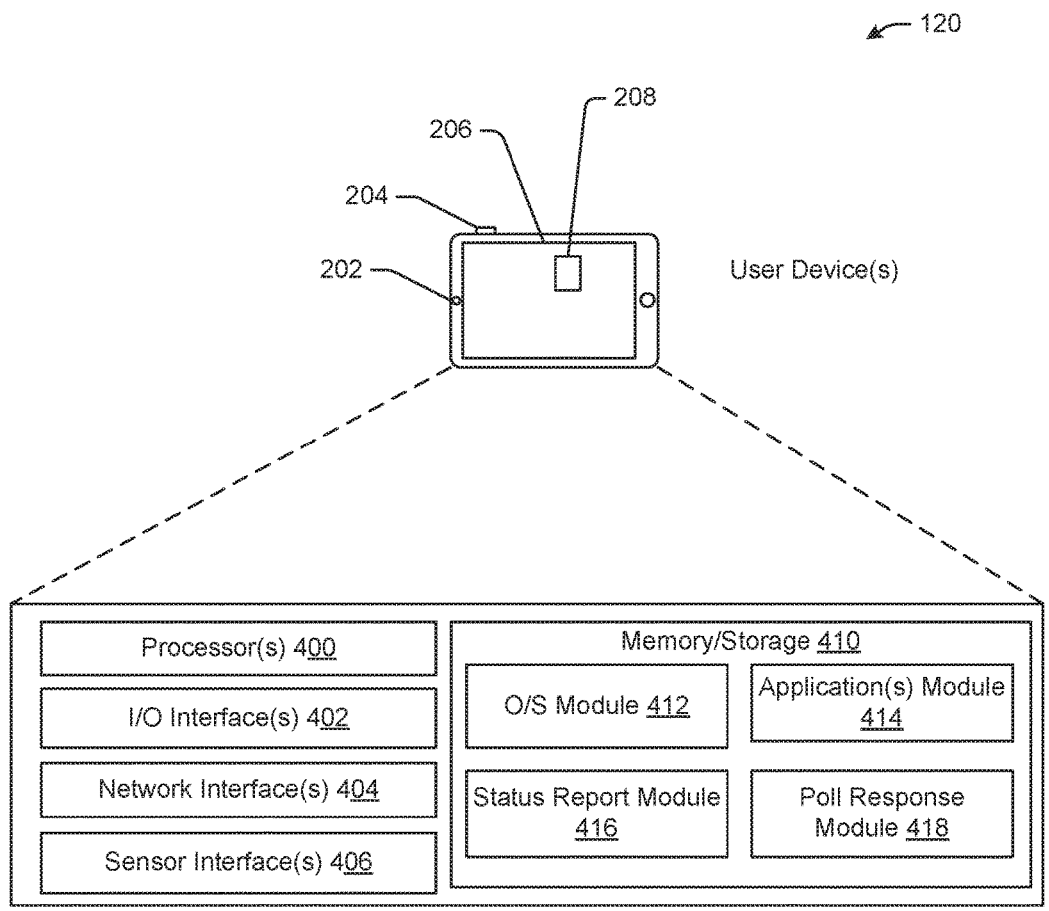
FIG. 4 is a block diagram of an example user device for responding to a polling request from the messaging server(s) of FIG. 3 and for receiving a message, in accordance with example embodiments of the disclosure.

FIG. 4 is a block diagram of an example user device 120 for responding to a polling request from the messaging server(s) 230 of FIG. 3 and for receiving a message, in accordance with example embodiments of the disclosure. The user device 120 may include one or more processor(s) 400, one or more I/O device interface(s) 402, one or more network interface(s) 404, one or more sensor interface(s) 406, and one or more memories/storage 410. The description of the processor(s) 400, the I/O device interface(s) 402, the network interface(s) 404, and the one or more memory/storage 410 may be substantially similar to processor(s) 300, the I/O device interface(s) 302, the network interface(s) 304, and the one or more memory/storage 310, respectively, of the messaging server(s) 230, as described in reference to FIG. 3 and, in the interest of brevity, will not be repeated here. The one or more sensor interface(s) 406 may enable the processor(s) 400 to receive and interpret sensor data from the one or more sensor(s) of the user device 120, such as the camera/image sensor 202, the microphone 204, the motion sensors 208, and/or global navigation satellite system (GNSS) apparatus.

The memory/storage 410 may store program instructions that are loadable and executable on the processor(s) 400, as well as data generated or received during the execution of these programs. Turning to the contents of the memory/storage 410 in more detail, the memory/storage 410 may include one or more operating systems (O/S) 412, an applications module 414, a status report module 416, and a poll response module 418. Each of the modules and/or software may provide functionality for the user device 120, when executed by the processors 400. The modules and/or the software may or may not correspond to physical locations and/or addresses in memory/storage 410. In other words, the contents of each of the modules 412, 414, 416, 418 may not be segregated from each other and may, in fact be stored in at least partially interleaved positions on the memory/storage 410.

The O/S module 412 may have one or more operating systems stored thereon. The processors 400 may be configured to access and execute one or more operating systems stored in the (O/S) module 412 to operate the system functions of the user device 120. System functions, as managed by the operating system may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like.

The application(s) module 414 may contain instructions and/or applications thereon that may be executed by the processors 400 to provide one or more services. These instructions and/or applications may, in certain aspects, interact with the (O/S) module 412 and/or other modules of the user device 120. The applications module 414 may have instructions, software, and/or code stored thereon that may be launched and/or executed by the processors 400 to execute one or more applications and functionality associated therewith. These applications may include, but are not limited to, functionality such as web browsing, business, communication, graphics, word processing, publishing, spreadsheets, databases, gaming, education, entertainment, media, project planning, engineering, drawing, or combinations thereof. In certain embodiments, the applications that are stored in the applications module 414 and executable by the processors 400 may provide functionality associated with rendering messages to users 110 and/or responding to polling requests from the messaging server(s) 230.

The status report module 416 may have instructions stored thereon that when executed by the processor(s) 400, configure the user device 120 to perform a variety of functions associated with reporting its standby or inactive mode status. The processors 400 may be configured to provide an indication of when the user device 120 is entering an inactive mode and/or exiting an inactive mode. This indication may be provided as a message, such as in the form of one or more data packets, transmitted by the user device 120 to the messaging server(s) 230 and/or other entities of the environment 200 just prior to the user device 120 entering the inactive mode and indicating the same and/or just after the user device 120 wakes-up from inactive mode and again, indicating the same. By providing information regarding when the user device 120 enters and/or exits an inactive mode, the messaging server(s) 230 have information that enables the messaging server(s) 230 to avoid polling those user devices 120 that are in an inactive mode.

The poll response module 418 may have instructions stored thereon that when executed by the processors 400 may enable the user device 120 to provide various functionality associated with receiving a poll request from a messaging server 230 and responding to the received poll request by generating and transmitting a poll response. The processor(s) 400 may be configured to log interactions with a user 110. These interactions may include any variety of suitable information that may indicate a user's interactions, activity, and/or proximity to the user device 110. The interactions may include, but are not limited to, motion information (e.g. sensed vibrations via a MEMS accelerometer), sounds (e.g. a user's voice recognized by the user device 110), images (e.g. a user's facial recognition), location information (e.g. GNSS coordinates), direct user input (e.g., a user gesture performed on a touch sensitive screen of the user device 110 or keystrokes on a keyboard) and/or output (e.g., a media content being rendered by the user device 110 or an application being executed by the user device 110). The processor(s) 400 may log the interactions in the memory/storage 410 of the user device 120.

The processor(s) 400, by further executing the instructions stored in the poll response module 418, may be configured to receive a polling request, such as from the messaging server(s) 230 via the network(s) 220. The processor(s) 400 may be configured to access the log of user interactions associated with the user device 120 and select one or more of the user interactions. The selected user interactions may be those user interactions that may be deemed relatively more relevant by the messaging server(s) 230 in assessing the level of interaction, activity, and/or proximity between the user 110 to whom the message is to be sent and the user device 120. The processor(s) 400 may be configured to the select from the log of user interactions based at least in part on a weighting associated with each type of user interactions and/or based at least in part on a corresponding time associated with a logged user interaction. In example embodiments, the processor(s) 400 may weigh relatively more active and direct user interactions with a greater weight (e.g., more indicative of greater user 110 interaction, activity, and/or more relative user 110 proximity) than relatively more passive and or indirect interactions. In the same or other embodiments, the processor(s) 400 may weigh relatively more recent user interactions with a greater weight (e.g., more indicative of greater user 110 interactions, activity, and/or more relative user 110 proximity) than relatively less recent user interactions.

The processor(s) 400, by executing the instructions stored in the poll response module 418 and upon selecting one or more user interactions, may be configured to generate a polling response message including an indication of the selected user interaction(s) and their corresponding times. In example embodiments, the processor(s) 400 may be configured to include an indication of the user 110 to whom the message is to be sent and/or an identification of the user device 120 providing the poll response. This information may be used by the messaging server(s) 230 to determine the source of poll response message(s) coming from a plurality of user devices. The processor(s) 400, in example embodiments, may further be configured to transmit this polling response to the messaging server(s) 230, where the polling response may be used to select a message destination user device from among the user devices 120 associated with the user 110 to whom the message is to be delivered. The user device 120 may be configured to transmit the polling response as one or more data packets via the network(s) 220 to the messaging server(s) 230.

In some example embodiments, the polling response may include one or more user interactions and corresponding times of the user interactions for the messaging server(s) 230 to process. In other example embodiments, the user device 120 may provide an assessment of an interaction score and/or a user identity score. In these embodiments, the processor(s) 400 may be configured to generate the interaction score based at least in part on direct interaction, such as touching a touch sensitive display 206, physical movement, such as detecting the device is in motion via an accelerometer or gyro sensor, network movement, such as determining the user device is in motion via cell or WiFi network proximity, proximity of a user determined from ambient audio (e.g. speaking in room) or direct audio (e.g. speaking during a phone call), and/or detection of nearby motion. The processor(s) 400, in example embodiments, may also provide an estimate of identity confidence that the activity in question represents the specific user who is the message recipient. The identity confidence score may be determined using a variety of factors including, but not limited to, the user device type (e.g., a television is relatively more likely to be shared, a tablet is somewhat likely to be shared, a phone is less likely to be shared), logged in sessions, for user devices 120 that support user profiles (e.g., logging into a computer), voiceprint matching (e.g., user's voice detection), media content being rendered on user device 120 or applications being executed on user device 120 (e.g., media content and/or application preferences of shared users 110 may be known and stored as user profiles of shared users 110).

It will be appreciated that there may be overlap in the functionality of the instructions stored in the operating systems (O/S) module 412, the applications module 414, the status report module 416, and the poll response module 418. In fact, the functions of the aforementioned modules 412, 414, 416, 418 may interact and cooperate seamlessly under the framework of the user device 120. Indeed, each of the functions described for any of the modules 412, 414, 416, 418 may be stored in any module 412, 414, 416, 418 in accordance with certain example embodiments of the disclosure. Further, in certain example embodiments, there may be one single module that includes the instructions, programs, and/or applications described within the operating systems (O/S) module 312, the applications module 314, the status report module 416, and the poll response module 418.

Illustrative Processes

Figure 5:
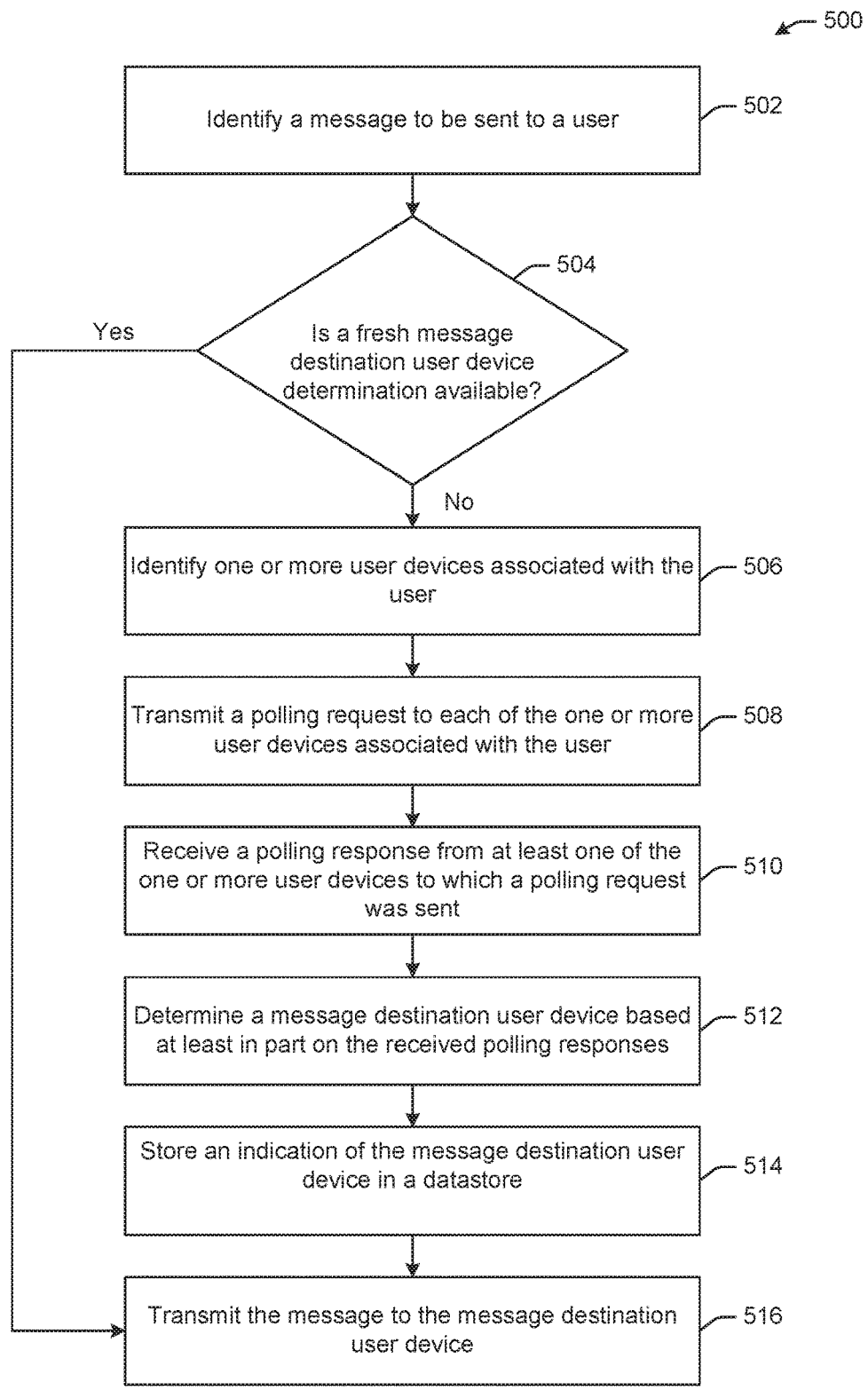
FIG. 5 is a flow diagram of an example method for transmitting a message to a message destination user device, in accordance with example embodiments of the disclosure.

FIG. 5 is a flow diagram of an example method 500 for transmitting a message to a message destination device, in accordance with example embodiments of the disclosure. The method 500 may be performed, in example embodiments, by the messaging server(s) 230 and the processors 300 thereon. In example embodiments, the messaging server(s) 230 may cooperate with other entities of environment 200 to perform method 500. At block 502, a message to be sent to a user may be identified. In some example embodiments, the message may have been generated at the messaging server(s) 230 and the processors 300 thereon. In other example embodiments, the message may be received by the messaging server(s) 230 from one or more other sources, such as the content server(s) 240. In yet other example embodiments, the messaging server(s) 230 may receive content from one or more other sources, such as the content server(s) 240 and generate a message therefrom. The message may be addressed to a particular user account. In some cases, this user account may be an individual user account (e.g., corporate email account). In other cases, this user account may be associated with more than one user account. In some cases, identifying a user 110 to whom the message is to be transmitted may be based at least in part on the email address, mobile phone number, or other address information to which the message is to be sent. In other cases, such as when multiple users 110 and/or profiles are associated with same account, email address, user device 120 additional elements may be considered in identifying the user 110 that is to receive the message. This analysis may consider elements such as content type of the message (e.g., children's content v. adult content, past usage history, preferences associated with a user 110, purchase history of the user 110, demographical data associated with the user 110, etc.).

At block 504, it may be determined if a fresh message destination user device determination is available. This may be determined by accessing the most recent message destination user device assessment and a timestamp associated therewith, such as from profile datastore 232. Based at least in part on the timestamp, it may be determined if the assessment of the message destination user device is within a threshold time period of the present time. For example, the threshold time period may be 3 minutes. Therefore, in this case, if it is found that the most recent determination of the message destination user device has been within 3 minutes, then the method may use the result of that most recent message destination user device to route the message. However, in this example, if the determination is more than 3 minutes old, then it may be determined that the most recent determination of the message destination user device is not fresh enough.

If it is determined, at block 504, that a fresh message destination user device is available, then the method 500 may proceed to block 516, where the message may be transmitted to the message destination user device. If however, at block 504, it is determined that a fresh message destination user device is not available, then the method may proceed to block 506 where one or more user devices associated with the user may be identified. The one or more user devices 120 associated with the user 110 may be ascertained from a user profile that may be accessible and/or updateable by the messaging server(s) 230. In some cases, the user profile may provide an identification of all of the user devices 120 on which the user 100 may be able to receive his/her message. Additionally, in some example embodiments, the user profile also indicate which of the user devices 120 associated with the user 110 may be shared user devices 120 and which of the user devices 120 are not or are unlikely to be shared user devices 120. This user profile may further indicate other user(s) 110 and/or user accounts associated with user devices of a user. An example of such a data structure is shown as Table 1 below. This type of data structure may be accessed, in example embodiments, in profile datastore 232. This type of data structure may further be enhanced with demographical, user behavior, and/or purchase history associated with each of the users 110.

TABLE 1

Example data structure of user account, user(s), user device, other user(s) information.

| User Account | User(s) | User Device(s) | Other User(s) |
|---|---|---|---|
| John.Doe@domain1.com | John Doe | Mobile Phone 1 | None |
| | | Mobile Phone 2 | Jane Doe |
| | | Laptop 1 | Jane Doe; Jill Doe |
| Doe.Family@domain2.com | John Doe | Mobile Phone 1 | None |
| | | Mobile Phone 2 | Jane Doe |
| | | Laptop 1 | Jane Doe; Jill Doe |

TABLE 1-continued

Example data structure of user account,
user(s), user device, other user(s) information.

| User Account | User(s) | User Device(s) | Other User(s) |
|---|---|---|---|
| | Jane Doe | Mobile Phone 2 | John Doe |
| | | Mobile Phone 3 | None |
| | | Laptop 1 | John Doe; Jill Doe |
| | | Tablet 1 | Jane Doe |
| | Jimmy Doe | Desktop 1 | |
| | Jill Doe | Laptop 1 | John Doe; Jane Doe |

At block 508, a polling request may be transmitted to each of the one or more user devices associated with the user. The polling request may request a response from each of the user devices 120 to which the polling request was sent. In some example embodiments, the expected poll request may identify the user 110 associated with the polling request.

At block 510, a polling response may be received from at least one of the one or more user devices to which a polling request was transmitted. In example embodiments, the polling response may be accepted by the messaging server(s) and the processors 300 thereon for a predetermined time window after the polling request had been sent in the previous process of block 508. By having a predetermined time window for a response, a relatively minimum and/or controlled level of latency may be added by waiting for the polling response. For example, the predetermined time window may be approximately 15 seconds. In some example embodiments, the polling response may carry an interaction score and an identity confidence score of each of the responding user devices 120. The interaction score may be indicative of the probability and/or the level of interaction that a user 110 (e.g., any user 110) of the user device 120 is having and/or has relatively recently had with the user device. In some example embodiments, a greater level and/or probability of active interaction may result in a relatively greater interaction score. The identity confidence score may be indicative of the probability and/or level of confidence that the user 120 that is interacting with the user device is indeed the user 110 to whom the message is to be transmitted.

In other example embodiments, the received polling response from the user devices 120 may not include either the interaction score or the identity confidence score. In these example embodiments, the polling response from the user devices 120 may include an indication of one or more user interactions and corresponding times of the user interactions. In example embodiments, the user interactions indicated in the polling responses from each of the user devices 120 may be those that are most likely to indicate a level of the user's interaction, activity with, and/or proximity to the user device 120. Additionally the user interactions indicated in the polling response may be those that most likely to indicate if the user interacting with the user device 120 is indeed the user 110 to whom the message is to be provided.

At block 512, a message destination user device may be determined based at least in part on the received polling responses. In example embodiments where the polling response carries the interaction score and/or the identity confidence score, the messaging server(s) 230 may be configured to identify these scores from the received polling responses and use the same to identify the user device. In example embodiments, these scores may be compared across user devices 120 to identify the user device with a relatively high interaction score and a relatively high identity score. In some cases, these scores may be normalized across different types of user devices 120.

In other example embodiments, the polling responses, instead of providing the interaction score and the identity confidence score, may include an indication of one or more user interactions of the user device and the corresponding times of those user interactions. In these embodiments, the messaging server(s) 230 may determine an interaction score and/or identity confidence score based at least in part on the user interaction information received from the responding user devices 120. In example embodiments, one or more user interaction rules may be employed to determine the interaction scores for each of the user devices 120 based at least in part on the received user interaction information of the user devices 120. In some example embodiments, the identity score may be on a fixed numerical scale (e.g., 1 to 100, 1 to 10, etc.). In some example embodiments, a higher score may indicate a greater likelihood that a user 110, but not necessarily the user 110 that is to receive the message, is interacting with the user device 120. Therefore, the user interaction rules may provide for different levels of interaction points for different types of user interactions with the user device 120.

The identity confidence score may be determined in a similar fashion as the interaction score. In example embodiments, one or more identity confidence rules may be employed to determine the identity confidence scores for each of the user devices 120 based at least in part on the received user interaction information of the user devices 120. In some example embodiments, the identity confidence score may be on a fixed numerical scale (e.g., 1 to 100, 1 to 10, etc.). In some example embodiments, a higher score may indicate a greater likelihood that a user 110 that is interacting with the user device 120 is indeed the user 110 to whom the message is to be routed. Therefore, the identity confidence rules may provide for different levels of identity confidence points for different types of user interactions with the user device 120. In example embodiments, the combination of the interaction score and the identity confidence score may be used to determine the message destination user device.

At block 514, an indication of the message destination user device may be stored in a datastore. The storage datastore, in example embodiments, may be the profile datastore 232. This indication of the message destination user device may be stored in conjunction with a timestamp and referenced to the user 110. When a subsequent message needs to be delivered to the same user 110, the stored message destination user device may be accessed and the timestamp may be utilized to determine if the stored message destination user device is fresh by the processes of block 504. At block 516, the message may be transmitted to the message destination user device.

It will be appreciated that in some example cases, at block 510, none of the polled user devices 510 may provide a polling response. In this case, the user devices 120 may be disconnected from a communicative network 220, in an inactive mode, or otherwise predisposed or unable to provide a polling response to the messaging server(s) 230. As a result, a message destination user device may be selected based on factors other than the polling response received from the user devices 120. In example embodiments, the message may be transmitted to the last determined message destination user device, despite that assessment being deemed to not be fresh at the processes of block 504. In other example embodiments, there may be a default user device 120 or user device type (e.g., smartphone or wearable device) that is to receive the message, if an assessment of the message destination user device cannot be made. In yet other embodiments, the transmission of the message may be queued for a later time. In this case, the method 500 may be performed at a later time to establish a new message destination user device for the purposes of transmitting the message.

It should be noted that the method 500 may be modified in various ways in accordance with certain embodiments. For example, one or more operations of the method 500 may be eliminated or executed out of order in other embodiments. Additionally, other operations may be added to the method 500 in accordance with other embodiments.

Figure 6:
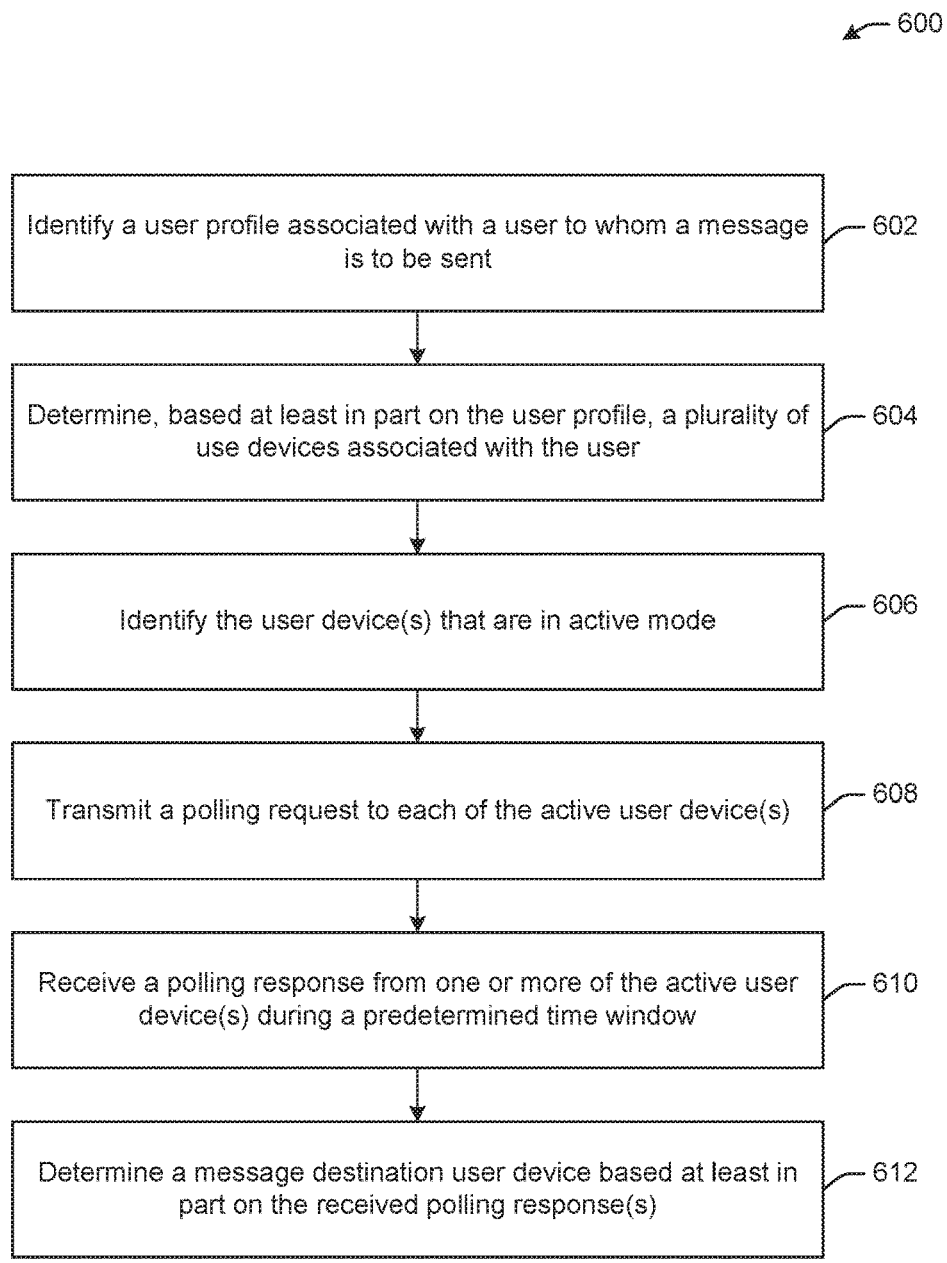
FIG. 6 is a flow diagram of an example method for determining a message destination user device, in accordance with example embodiments of the disclosure.

FIG. 6 is a flow diagram of an example method 600 for determining a message destination device, in accordance with example embodiments of the disclosure. The method 600 may be performed, in example embodiments, by the messaging server(s) 230 and the processors 300 thereon. In example embodiments, the messaging server(s) 230 may cooperate with other entities of environment 200 to perform method 600. At block 602, a user profile associated with a user to whom a message is to be sent may be identified. This user profile may be stored, accessed, and maintained on a datastore, such as the user profile datastore 232.

At block 604, a plurality of user devices associated with the user may be determined based at least in part on the user profile. As discussed in reference to the processes of block 506 of method 500 of FIG. 5, the user profile may provide a listing of all or some of the user devices 120 that are associated with a particular user 110. The user profile may further provide information about whether the user devices 120 associated with a particular user 110 are shared or unshared user devices 120.

At block 606, the user device(s) that are in active mode may be identified. The messaging server(s) 230 and the processor(s) 300 thereon may track which of the user devices 120 of the user 110 are in inactive mode. At block 608, a polling request may be transmitted to each of the active user device(s). In other words, a polling request may not be sent to those user devices 120 that are in inactive mode. At block 610, a polling response may be received from one or more of the active user device(s) during a predetermined time window. In some cases, all of the polled user devices 120 may not be able to respond to the messaging server(s) within the predetermined time window. This may be, in some cases, for lack of a reliable communicative connection to the networks 220 for some of the polled user devices 120. The predetermined time window may be used as a cut-off for receiving polling responses so that the latency in transmitting the message to the destination user device 120 is kept relatively low. At block 612, a message destination user device may be determined based at least in part on the received polling response(s). This process may be performed similarly to the processes of block 512 of method 500 of FIG. 5, as described above.

It should be noted that the method 600 may be modified in various ways in accordance with certain embodiments. For example, one or more operations of the method 600 may be eliminated or executed out of order in other embodiments. Additionally, other operations may be added to the method 600 in accordance with other embodiments.

Figure 7:
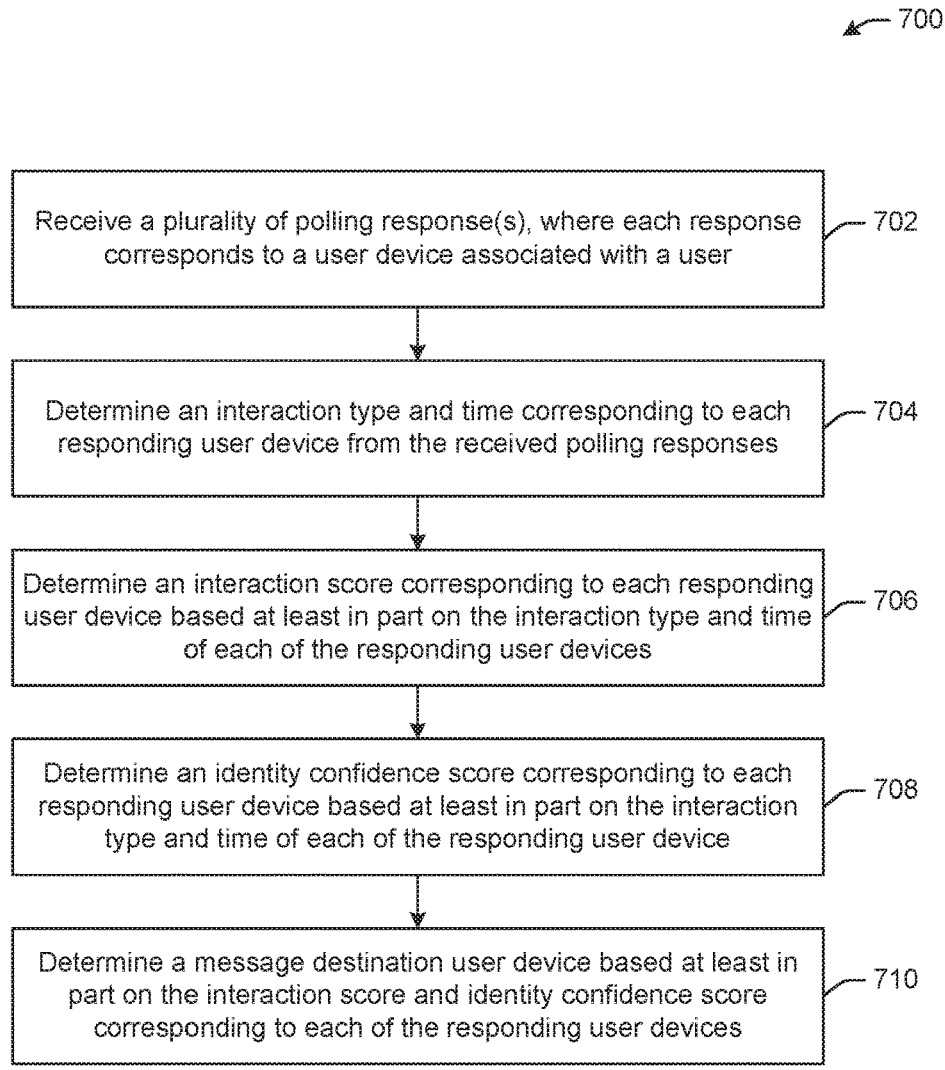
FIG. 7 is a flow diagram of another example method for determining a message destination user device, in accordance with example embodiments of the disclosure.

FIG. 7 is a flow diagram of another example method 700 for determining a message destination device, in accordance with example embodiments of the disclosure. The method 700 may be performed, in example embodiments, by the messaging server(s) 230 and the processors 300 thereon. In example embodiments, the messaging server(s) 230 may cooperate with other entities of environment 200 to perform method 700. In example embodiments, method 700 may be an example implementation of processes 510 and 512 of method 500, as depicted in FIG. 5. In this method, the interaction score and the identity confidence scores may be determined at the messaging server(s) 230, rather than at the user devices 120. At block 702, a plurality of polling response(s) may be received. As discussed above the polling response(s) may be received from one or more user device(s) 120, responsive to transmitting a polling request to each of the one or more user device(s) 120. At block 704, an interaction type and time corresponding to each responding user device may be determined from the received polling responses. This information may be carried by each of the polling responses for each of the responding user devices 120.

At block 706, an interaction score corresponding to each responding user device may be determined based at least in part on the interaction type and time of each of the responding user devices. The messaging server(s) 230 may determine an interaction score and/or identity confidence score based at least in part on the user interaction information received from the responding user devices 120. In example embodiments, one or more user interaction rules may be employed to determine the interaction scores for each of the user devices 120 based at least in part on the received user interaction information of the user devices 120. In some example embodiments, the identity score may be on a fixed numerical scale (e.g., 1 to 100, 1 to 10, etc.). In some example embodiments, a higher score may indicate a greater likelihood that a user 110, but not necessarily the user 110 that is to receive the message, is interacting with the user device 120. Therefore, the user interaction rules may provide for different levels of interaction points for different types of user interactions with the user device 120. In example embodiments, active user interactions may result in greater points than more passive user interactions. For example, one set of user interaction rules may provide for greater points for active user input to the user device 120 than by the user device 120 than motion detected by the user device 120. Continuing with the example user interaction rules, the motion detected by the user device 120 may, in turn, result in greater interaction points than detecting an image of a user 110 or detecting a sound from a user 110 of the user device 120, and that in turn may result in greater points than an interaction where the user device executes a particular application and/or renders a media content thereon. The points for a particular type of user interaction may then be scaled for the freshness of that user interaction. For example, the points assigned for a particular user interaction for determination of the interaction score may be scaled by the number of seconds that have elapsed since that user interaction occurred. In this way, the messaging server(s) 230 may generate an interaction score that may be compared across the responding user devices 120.

At block 708, an identity confidence score corresponding to each responding user device may be determined based at least in part on the interaction type and time of each of the responding user devices. The identity confidence score may be determined in a similar fashion as the interaction score. In example embodiments, one or more identity confidence rules may be employed to determine the identity confidence scores for each of the user devices 120 based at least in part on the received user interaction information of the user devices 120. In some example embodiments, the identity confidence score may be on a fixed numerical scale (e.g., 1 to 100, 1 to 10, etc.). In some example embodiments, a higher score may indicate a greater likelihood that a user 110 that is interacting with the user device 120 is indeed the user 110 to whom the message is to be routed. Therefore, the identity confidence rules may provide for different levels of identity confidence points for different types of user interactions with the user device 120. In example embodiments, positive identification of the target user 110 may result in relatively greater points than user interactions that do not provide a positive identification of the user 110. For example, one set of user interaction rules may provide for greater points for a facial or voice recognition in proximity of the user device than input to the user device 120 with the user 110 logged-in. Continuing with the example identity confidence rules, the input to the user device 120 with the user 110 logged-in may, in turn, result in greater identity confidence points than detecting motion of the user device 120, and that in turn may result in greater points than an interaction where the user device executes a particular application and/or renders a media content thereon. The identity confidence points for a particular type of user interaction may then be scaled for the freshness of that user interaction. For example, the points assigned for a particular user interaction for determination of the identity confidence score may be scaled by the number of seconds that have elapsed since that user interaction occurred. In this way, the messaging server(s) 230 may generate an identity confidence score that may be compared across the responding user devices 120. At block 710, a message destination user device may be determined based at least in part on the interaction score and identity confidence score corresponding to each of the responding user devices.

It should be noted that the method 700 may be modified in various ways in accordance with certain embodiments. For example, one or more operations of the method 700 may be eliminated or executed out of order in other embodiments. Additionally, other operations may be added to the method 700 in accordance with other embodiments.

Figure 8:
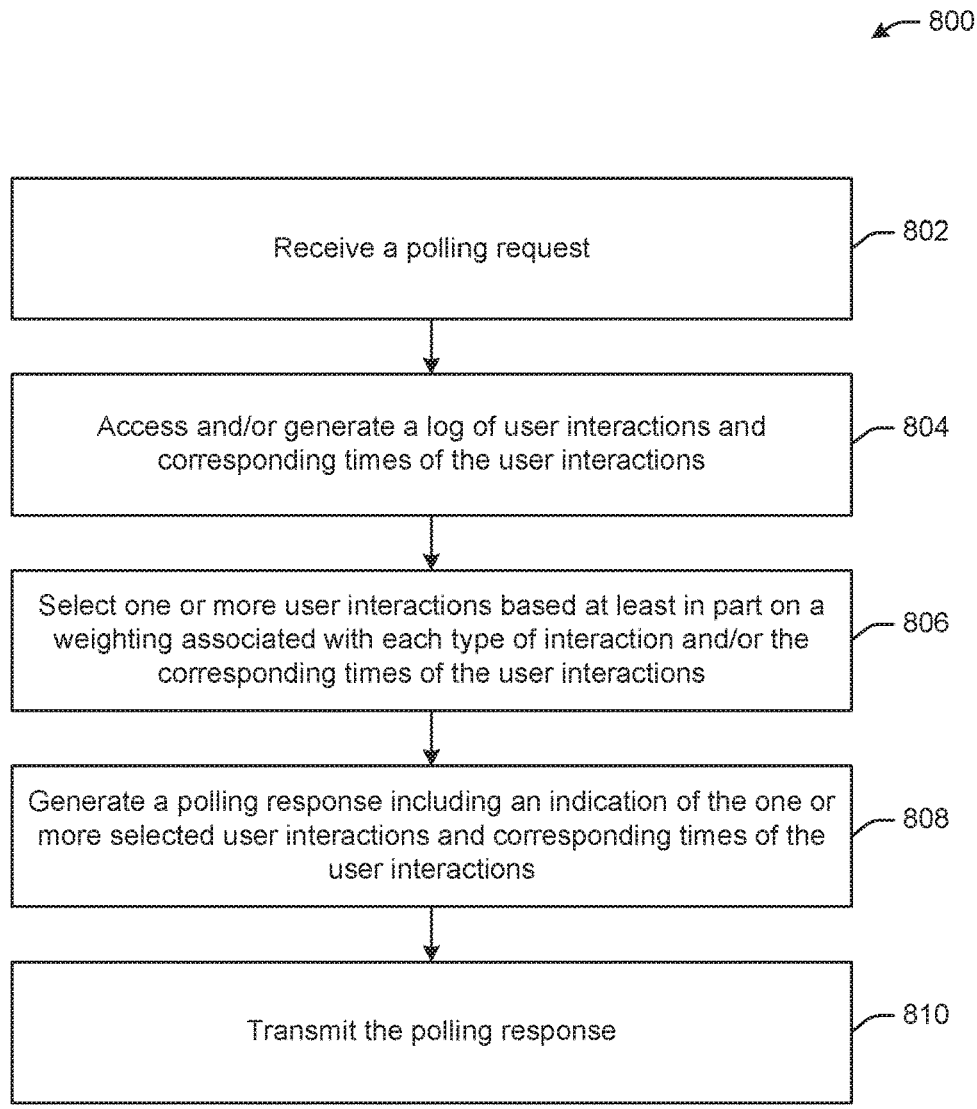
FIG. 8 is a flow diagram of an example method for receiving a polling request and providing a polling response in response to the polling request, in accordance with example embodiments of the disclosure.

FIG. 8 is a flow diagram of an example method 800 for receiving a polling request and providing a polling response in response to the polling request, in accordance with example embodiments of the disclosure. The method 800 may be performed, in example embodiments, by a user device 120 and the processors 400 thereon. In example embodiments, the user device 120 may cooperate with other entities of environment 200 to perform method 800.

At block 802 a polling request may be received. This polling request may be received, in example embodiments, from the messaging server(s) 230 via the network(s) 220. The polling request, in some cases, may include an identifier of the user to whom the message is to be delivered. The polling request may also indicate that user interaction information is requested by the messaging server(s) 230 from the user device 120 and the processors 400 thereon.

At block 804, the user device 120 may access a log of user interactions and corresponding times of the user interactions. The user device 120, by running applications thereon, may have been logging all or some user interaction activities. The user interactions may include, but are not limited to, motion information (e.g. sensed vibrations via a MEMS accelerometer), sounds (e.g. a user's voice recognized by the user device 110), images (e.g. a user's facial recognition), direct user input (e.g., a user gesture performed on a touch sensitive screen of the user device 110 or keystrokes on a keyboard) and/or output (e.g., a media content being rendered by the user device 110 or an application being executed by the user device 110). The user device 120 may have been logging the interactions in memory/storage 410 of the user device 120. In example embodiments, the user device may have been logging the user interactions in a rolling manner, where, as new user interactions are logged, older user interactions may be purged from the log. In response to the poll request, the user device 120 may access the log of user interactions for the purposes of reporting one or more of the user interactions to the messaging server(s) 230.

At block 806, one or more of the user interactions may be selected based at least in part on a weighting associated with each type of interaction and/or corresponding times of each of the user interactions. The selected user interactions may be those user interactions that are likely to be deemed the most relevant by the messaging server(s) 230 in assessing the relative level of interactions, activity, and/or proximity of the user 110 to whom the message is to be sent to the user device 120. In example embodiments, a relatively recent and direct user input to the user device 120 may be more relevant to deeming that user device 120 is the message destination user device than, for example, an audio based detection of the user's voice at a relatively longer time period from the present. Therefore, the direct user input interaction may be selected. In example embodiments, the user device 120 and the processors 400 thereon may weigh relatively more active and direct user interactions with a greater weight than relatively more passive and or indirect interactions. Furthermore, the user device 120 and the processors 400 thereon may weigh relatively more recent user interactions with a greater weight (e.g., more indicative of greater user 110 interactions, activity, and/or more relative user 110 proximity) than relatively less recent user interactions.

At block 808, a polling response including an indication of the one or more selected user interactions and corresponding times of the user interactions may be generated. The polling response may be in the form of one or more data packets and may include an identifier of the user to whom the message is to be delivered and/or an identification of the user device 120. At block 810, the polling response may be transmitted. The user device 120 may transmit the polling response via the network(s) 220 to the messaging server(s) 230.

In some embodiments, instead of providing the indication of user interaction(s) in the polling response, the user device 120 may provide an interaction score and an identity confidence score. The user device 120 may determine an interaction score and/or identity confidence score based at least in part on the selected user interaction information of the processes of block 806. In example embodiments, one or more user interaction rules may be employed to determine the interaction scores for each of the user devices 120 based at least in part on the selected user interaction information. In some example embodiments, the identity score may be on a fixed numerical scale (e.g., 1 to 100, 1 to 10, etc.). In some example embodiments, a higher score may indicate a greater likelihood that a user 110, but not necessarily the user 110 that is to receive the message, is interacting with the user device 120. Therefore, the user interaction rules may provide for different levels of interaction points for different types of user interactions with the user device 120. In example embodiments, active user interactions may result in greater points than more passive user interactions. For example, one set of user interaction rules may provide for greater points for active user input to the user device 120 than by the user device 120 than motion detected by the user device 120. Continuing with the example user interaction rules, the motion detected by the user device 120 may, in turn, result in greater interaction points than detecting an image of a user 110 or detecting a sound from a user 110 of the user device 120, and that in turn may result in greater points than an interaction where the user device executes a particular application and/or renders a media content thereon. The points for a particular type of user interaction may then be scaled for the freshness of that user interaction. For example, the points assigned for a particular user interaction for determination of the interaction score may be scaled by the number of seconds that have elapsed since that user interaction occurred. In this way, the user device 120 may generate an interaction score that may be compared with other user devices 120.

The identity confidence score may be determined in a similar fashion as the interaction score. In example embodiments, one or more identity confidence rules may be employed to determine the identity confidence scores for each of the user devices 120 based at least in part on the received user interaction information of the user devices 120. In some example embodiments, the identity confidence score may be on a fixed numerical scale (e.g., 1 to 100, 1 to 10, etc.). In some example embodiments, a higher score may indicate a greater likelihood that a user 110 that is interacting with the user device 120 is indeed the user 110 to whom the message is to be routed. Therefore, the identity confidence rules may provide for different levels of identity confidence points for different types of user interactions with the user device 120. In example embodiments, positive identification of the target user 110 may result in relatively greater points than user interactions that do not provide a positive identification of the user 110. For example, one set of user interaction rules may provide for greater points for a facial or voice recognition in proximity of the user device 120 than input to the user device 120 with the user 110 logged-in. Continuing with the example identity confidence rules, the input to the user device 120 with the user 110 logged-in may, in turn, result in greater identity confidence points than detecting motion of the user device 120, and that in turn may result in greater points than an interaction where the user device executes a particular application and/or renders a media content thereon. The identity confidence points for a particular type of user interaction may then be scaled for the freshness of that user interaction. For example, the points assigned for a particular user interaction for determination of the identity confidence score may be scaled by the number of seconds that have elapsed since that user interaction occurred. In this way, the user device 120 may generate an identity confidence score that may be compared with other user devices 120. At block 810, the polling response may be transmitted, such as to the messaging server(s) 230.

It should be noted that the method 800 may be modified in various ways in accordance with certain embodiments. For example, one or more operations of the method 800 may be eliminated or executed out of order in other embodiments. Additionally, other operations may be added to the method 800 in accordance with other embodiments.

Figure 9:
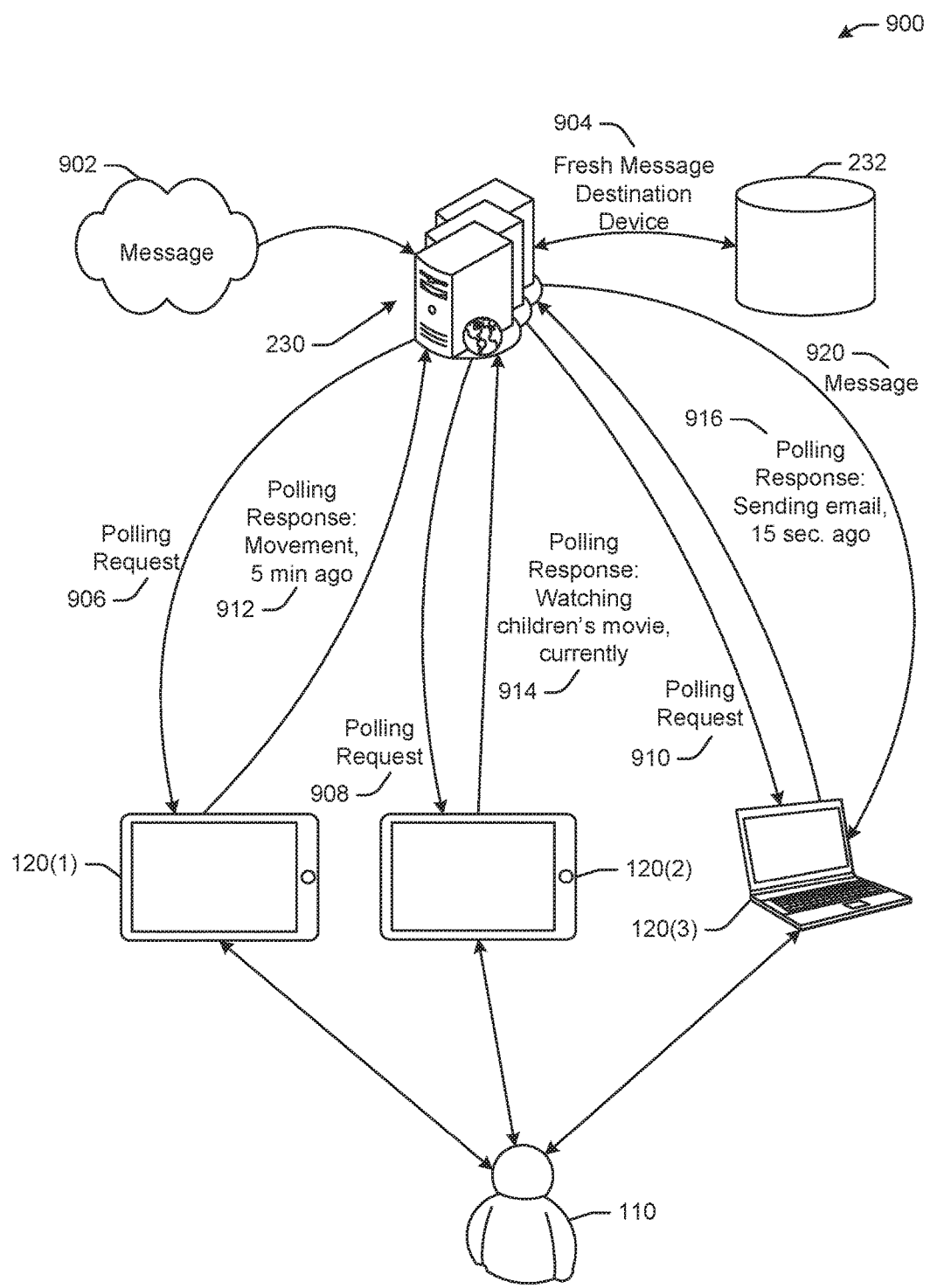
FIG. 9 illustrates a schematic representation of the methods depicted in FIG. 5 and FIG. 8 for transmitting a message to a message destination device, in accordance with example embodiments of the disclosure.

FIG. 9 illustrates a schematic representation of the methods depicted in FIG. 5 and FIG. 8 for transmitting a message 902 to a message destination device 120, in accordance with example embodiments of the disclosure. The message 902 may be received by the messaging server 230. The messaging server 230 may access the profile datastore 232 to determine that a fresh message destination device 904 is not available. At this point, the messaging server 230 may determine the user devices 120(1), 120(2), 120(3) associated with the user 110, such as by accessing the user's user profile in the profile datastore 232. Upon identifying the user's user devices 120(1), 120(2), 120(3), the messaging server 230 may transmit a polling request 906, 908, 910 to each of the user devices 120(1), 120(2), 120(3), respectively. After sending the polling requests 906, 908, 910, the messaging server 230 may receive a polling response 912, 914, 916 from each of the user devices 120(1), 120(2), 120(3), respectively. From these polling responses, the messaging server 230 may determine that the message is to be delivered to user device 120(3) and therefore delivers the message 916 to the user device 120(3).

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, the distribution of software may be an Internet download.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed:

1. A system, comprising:
   at least one memory that stores computer-executable instructions;
   at least one processor configured to access the at least one memory, wherein the at least one processor is configured to execute the computer-executable instructions to:
   identify a plurality of user devices associated with a user account, including a first user device and a second user device;
   send a first polling request to the first user device and a second polling request to the second user device, wherein the first polling request instructs the first user device to provide an indication of user interaction with the first user device and the second polling request instructs the second user device to provide an indication of user interaction with the second user device;
determine that the first user device is a message destination user device; and
send a message to only the first user device of the plurality of user devices.

2. The system of claim 1, wherein the at least one processor is further configured to identify a user account to which the message is to be delivered.

3. The system of claim 1, wherein the at least one processor is further configured to:
receive, after transmitting the first polling request, a first polling response; and
receive, after transmitting the second polling request, a second polling response.

4. The system of claim 3, wherein the at least one processor configured to determine that the first user device is the message destination user device comprises the at least one processor configured to determine that the first user device is the message destination is based at least in part on a comparison of the first polling response.

5. The method of claim 3, wherein the at least one processor configured to receive the first polling response comprises the at least one processor configured to receive the first polling response within a threshold period of time.

6. The system of claim 3, wherein the first polling response includes an interaction score associated with the first user device and an identity confidence score associated with the first user device, and wherein determining that the first user device is a message destination user device is based at least in part on the interaction score associated with the first user device and the identity confidence score associated with the first user device.

7. The system of claim 3, wherein the first polling response includes a first indication of a first interaction and a first time associated with the first indication and the second polling response includes a second indication of a second interaction and a second time associated with the second indication.

8. The system of claim 7, wherein the at least one processor configured to determine that the first user device is the message destination user device comprises the at least one processor configured to:
identify a set of interaction rules for evaluating the first indication of the first interaction and the second indication of the second interaction;
identify a first level of interaction associated with the first user device based at least in part on the set of interaction rules, the first indication of the first interaction, and the first time associated with the first indication of the first interaction;
identify a second level of interaction associated with the second user device based at least in part on the set of interaction rules, the second indication of the second interaction, and the second time associated with the second indication of the second interaction; and
determine that the message is to be sent to the first user device based at least in part on the first level of interaction and the second level of interaction.

9. The system of claim 7, wherein the at least one processor configured to determine that the first user device is the message destination user device comprises the at least one processor configured to:
identify a set of identity confidence rules for evaluating the first indication of the first interaction and the second indication of second interaction;
identify a first level of identity confidence associated with the first user device based at least in part on the set of interaction rules, the first indication of the first interaction, and the first time associated with the first indication of the first interaction;
identify a second level of identity confidence associated with the second user device based at least in part on the set of interaction rules, the second indication of the second interaction, and the second time associated with the second indication of the second interaction; and
determine that the message is to be sent to the first user device based at least in part on the first level of identity confidence and the second level of identity confidence.

10. The system of claim 1, wherein the at least one processor is further configured to:
determine a time when a previous message destination user device was identified; and
determine, based at least in part on the time, that the time is outside of a time threshold,
wherein sending the first polling request to the first user device and the second polling request to the second user device is based at least in part on the determination that the time is outside of the time threshold.

11. The system of claim 1, wherein the plurality of user devices associated with the user includes a third user device and wherein the at least one processor is further configured to:
identify that the third user device is in an inactive mode based at least in part on an inactive mode message received from the third user device; and
determine that the third user device is to be removed from a list of user devices to be polled.

12. At least one non-transitory computer-readable medium comprising computer-executable instructions that, when executed by one or more processors, executes operations comprising:
identifying a plurality of user devices associated with a user account, including a first user device and a second user device;
sending a first polling request to the first user device and a second polling request to the second user device, wherein the first polling request instructs the first user device to provide an indication of user interaction with the first user device and the second polling request instructs the second user device to provide an indication of user interaction with the second user device;
determining that the first user device is a message destination user device; and
sending a message to only the first user device of the plurality of user devices.

13. The at least one non-transitory computer-readable medium of claim 12, wherein the operations further comprise:
receiving, after transmitting the first polling request, a first polling response; and
receiving, after transmitting the second polling request, a second polling response.

14. The at least one non-transitory computer-readable medium of claim 13, wherein receiving the first polling response comprises receiving the first polling response within a threshold period of time.

15. The at least one non-transitory computer-readable medium of claim 13, wherein the first polling response includes a first indication of a first interaction and a first time associated with the first indication and the second polling response includes a second indication of a second interaction and a second time associated with the second indication.

16. The at least one non-transitory computer-readable medium of claim 15, wherein determining that the first user device is the message destination user device comprises:
    identifying a set of interaction rules for evaluating the first indication of the first interaction and the second indication of the second interaction;
    identifying a first level of interaction associated with the first user device based at least in part on the set of interaction rules, the first indication of the first interaction, and the first time associated with the first indication of the first interaction;
    identifying a second level of interaction associated with the second user device based at least in part on the set of interaction rules, the second indication of the second interaction, and the second time associated with the second indication of the second interaction; and
    determining that the message is to be sent to the first user device based at least in part on the first level of interaction and the second level of interaction.

17. The at least one non-transitory computer-readable medium of claim 12, wherein the operations further comprise:
    determining a time when a previous message destination user device was identified; and
    determining, based at least in part on the time, that the time is outside of a time threshold,
    wherein sending the first polling request to the first user device and the second polling request to the second user device is based at least in part on the determination that the time is outside of the time threshold.

18. At least one non-transitory computer-readable medium comprising computer-executable instructions that, when executed by one or more processors, executes operations comprising:
    receiving a polling request;
    identifying one or more user interactions, including a first user interaction and a second user interaction;
    identifying a first timestamp corresponding to the first user interaction and second timestamp corresponding to the second user interaction;
    determining a first interaction mode of the first user interaction and a second interaction mode of the second user interaction;
    determining, based at least in part on the first interaction mode, the second interaction mode, the first timestamp, and the second timestamp, that content of a polling response is to include information about the first interaction;
    generating the polling response including the content based at least in part on the first user interaction and the first timestamp;
    sending the polling response; and
    receiving a message based at least in part on the polling response.

19. The at least one non-transitory computer-readable medium of claim 18, wherein the operations further comprise determining an interaction score based at least in part on the first user interaction and the first time stamp, and wherein the polling response includes the interaction score.

20. The at least one non-transitory computer-readable medium of claim 18, wherein the operations further comprise determining an identity confidence score based at least in part on the first user interaction and the first time stamp, and wherein the polling response includes the identity confidence score.

* * * * *